United States Patent [19]
Vondran, Jr.

[11] Patent Number: 5,666,437
[45] Date of Patent: Sep. 9, 1997

[54] APPARATUS FOR ROUTING INTERPOLATOR INPUT DATA BY PERFORMING A SELECTIVE TWO'S COMPLEMENT BASED ON SETS OF LOWER AND HIGHER ORDER BITS OF INPUT DATA

[75] Inventor: Gary L. Vondran, Jr., Winchester, Mass.

[73] Assignee: Hewlett-Packard Company, Palo Alto, Calif.

[21] Appl. No.: 691,786

[22] Filed: Aug. 2, 1996

[51] Int. Cl.$^6$ ............................................. H04N 1/60
[52] U.S. Cl. ........................... 382/167; 358/518; 358/525
[58] Field of Search ............................ 382/167; 358/518, 358/525, 523; 364/723

[56] References Cited

U.S. PATENT DOCUMENTS

| | | | |
|---|---|---|---|
| 3,893,166 | 7/1975 | Pugsley | 358/525 |
| 4,275,413 | 6/1981 | Sakamoto et al. | 358/525 |
| 4,477,833 | 10/1984 | Clark et al. | 358/525 |
| 4,511,989 | 4/1985 | Sakamoto | 358/525 |
| 5,121,196 | 6/1992 | Hung | 358/504 |

OTHER PUBLICATIONS

Kasson et al; Performing Color Space Conversions With Three–Dimensional Linear Interpolation; Jul. 1995.
Stone et al; Color Gamut Mapping And The Printing Of Digital Color Images; Oct. 1988.
Kanamori et al; A Novel Color Transformation Algorithm And Its Applications; 1990.
Hung; Color Rendition Using Three–Dimensional Interpolation; 1988.
Hung; Colorimetric Calibration In Electronic Imaging Devices Using Look–Up–Table Model And Interpolations; Jan. 1993.
Booktree Corporation; RGB To CMYK Color Space Conversion Considerations; Apr. 1990.
Paeth; Algorithms For Fast Color Correction; 1989.
Kanamori et al; Fast Color Processor With Programmable Interpolation By Small Memory (PRISM); Jul. 1993.
Gennetten, RGB to CMYK Conversion Using 3D–Barycentric Interpolation; Jun. 1993.
Kasson et al; Performing Color Space Conversion With Three–Dimensional Linear Interpolation; Jul. 1995.

Primary Examiner—Scott A. Rogers
Attorney, Agent, or Firm—Gregg W. Wisdom

[57] ABSTRACT

An apparatus for routing interpolator input data for a color space conversion from a RGB color space to a CMYK color space includes a selective two's complementer coupled to a hardware interpolator. The inputs to the selective two's complementer include three sets of four lower order bits, RL, GL, and BL of a twenty four bit RGB color space value and three least significant bits of three sets of four higher order bits, RH, GH, and BH. The inputs to the hardware interpolator include three outputs from the selective two's complementer and eight inputs for receiving interpolator input data from eight memory banks. The interpolation process can be regarded as determining a location within a cube of a cubic lattice formed from vertices represented by the interpolator input data values. The interpolator input data values are classified into one of eight classes based upon the evenness and oddness of the components of the vector formed from the three sets of higher order bits specifying the location of the corresponding vertex within the cubic lattice. Each of the eight memory banks stores one of the eight classes of interpolator input data values. The eight interpolator input data values corresponding to any cube within the cubic lattice are stored in the eight memory banks. To perform the interpolation, the eight interpolator input data values must be routed to computational blocks within the interpolator depending upon the evenness and oddness classification of each of the three sets of higher order bits corresponding to the interpolator input data value. By performing a two's complement on those sets of lower order bits corresponding to those sets of higher order bits classified as odd, the routing of the interpolator input data values is accomplished mathematically in the corresponding computational blocks.

18 Claims, 21 Drawing Sheets

| (E,E,E) RAM 2916 B | (O,E,E) RAM 2592 B | (E,O,E) RAM 2592 B | (O,O,E) RAM 2304 B | (E,E,O) RAM 2592 B | (O,E,O) RAM 2304 B | (E,O,O) RAM 2304 B | (O,O,O) RAM 2048 B | |
|---|---|---|---|---|---|---|---|---|
| a0 | a1 | a2 | a3 | a4 | a5 | a6 | a7 | (RH,GH,BH) |
| a1 | a0 | a3 | a2 | a5 | a4 | a7 | a6 | (RH+1,GH,BH) |
| a2 | a3 | a0 | a1 | a6 | a7 | a4 | a5 | (RH,GH+1,BH) |
| a3 | a2 | a1 | a0 | a7 | a6 | a5 | a4 | (RH+1,GH+1,BH) |
| a4 | a5 | a6 | a7 | a0 | a1 | a2 | a3 | (RH,GH,BH+1) |
| a5 | a4 | a7 | a6 | a1 | a0 | a3 | a2 | (RH+1,GH,BH+1) |
| a6 | a7 | a4 | a5 | a2 | a3 | a0 | a1 | (RH,GH+1,BH+1) |
| a7 | a6 | a5 | a4 | a3 | a2 | a1 | a0 | (RH+1,GH+1,BH+1) |

FIG.10

(E,E,E) RAM ADDRESS MAP

| | | | | | | | | | | | | |
|---|---|---|---|---|---|---|---|---|---|---|---|---|
| 1 x 4 BYTES<br>RH(7)-RH(4)=1,GH(7)-GH(4)=1<br>BH(7)-BH(4)=1 | 1 | 0 | 1 | 1 | 0 | 1 | 1 | 0 | 0 | 0 | P(1) | P(0) |
| | 1 | 0 | 1 | 1 | 0 | 1 | 0 | 1 | 1 | 1 | 1 | 1 |
| 8 x 4 BYTES<br>RH(7)-RH(4)=1,BH(7)-BH(7)=1 | 1 | 0 | 1 | 1 | 0 | 1 | 0 | GH(7) | GH(6) | GH(5) | P(1) | P(0) |
| | 1 | 0 | 1 | 1 | 0 | 1 | 0 | 0 | 0 | 0 | 0 | 0 |
| | 1 | 0 | 1 | 1 | 0 | 0 | 1 | 1 | 1 | 1 | 1 | 1 |
| 8 x 4 BYTES<br>RH(7)-RH(4)=1,GH(7)-GH(4)=1 | 1 | 0 | 1 | 1 | 0 | 0 | 1 | BH(7) | BH(6) | BH(5) | P(1) | P(0) |
| | 1 | 0 | 1 | 1 | 0 | 0 | 1 | 0 | 0 | 0 | 0 | 0 |
| | 1 | 0 | 1 | 1 | 0 | 0 | 0 | 1 | 1 | 1 | 1 | 1 |
| 8 x 4 BYTES<br>GH(7)-GH(4)=1,BH(7)-BH(4)=1 | 1 | 0 | 1 | 1 | 0 | 0 | 0 | RH(7) | RH(6) | RH(5) | P(1) | P(0) |
| | 1 | 0 | 1 | 1 | 0 | 0 | 0 | 0 | 0 | 0 | 0 | 0 |
| | 1 | 0 | 1 | 0 | 1 | 1 | 1 | 1 | 1 | 1 | 1 | 1 |
| 64 x 4 BYTES<br>RH(7)-RH(4)=1 | 1 | 0 | 1 | 0 | BH(7) | BH(6) | BH(5) | GH(7) | GH(6) | GH(5) | P(1) | P(0) |
| | 1 | 0 | 1 | 0 | 0 | 0 | 0 | 0 | 0 | 0 | 0 | 0 |
| | 1 | 0 | 0 | 1 | 1 | 1 | 1 | 1 | 1 | 1 | 1 | 1 |
| 64 x 4 BYTES<br>BH(7)-BH(4)=1 | 1 | 0 | 0 | 1 | RH(7) | RH(6) | RH(5) | GH(7) | GH(6) | GH(5) | P(1) | P(0) |
| | 1 | 0 | 0 | 1 | 0 | 0 | 0 | 0 | 0 | 0 | 0 | 0 |
| | 1 | 0 | 0 | 0 | 1 | 1 | 1 | 1 | 1 | 1 | 1 | 1 |
| 64 x 4 BYTES<br>GH(7)-GH(4)=1 | 1 | 0 | 0 | 0 | RH(7) | RH(6) | RH(5) | BH(7) | BH(6) | BH(5) | P(1) | P(0) |
| | 1 | 0 | 0 | 0 | 0 | 0 | 0 | 0 | 0 | 0 | 0 | 0 |
| | 0 | 1 | 1 | 1 | 1 | 1 | 1 | 1 | 1 | 1 | 1 | 1 |
| 512 x 4 BYTES | 0 | RH(7) | RH(6) | RH(5) | BH(7) | BH(6) | BH(5) | GH(7) | GH(6) | GH(5) | P(1) | P(0) |
| | 0 | 0 | 0 | 0 | 0 | 0 | 0 | 0 | 0 | 0 | 0 | 0 |

FIG.14

(E,E,0) RAM ADDRESS
MAP

| | | | | | | | | | | | | |
|---|---|---|---|---|---|---|---|---|---|---|---|---|
| 8 x 4 BYTES RH(7)-RH(4)=1, BH(7)-BH(4)=1 | 1 ⋮ 1 ⋮ 1 | 0 ⋮ 0 ⋮ 0 | 1 ⋮ 1 ⋮ 1 | 0 ⋮ 0 ⋮ 0 | 0 ⋮ 0 ⋮ 0 | 0 ⋮ 0 ⋮ 0 | 0 ⋮ 0 ⋮ 0 | 1 ⋮ GH(7) ⋮ 0 | 1 ⋮ GH(6) ⋮ 0 | 1 ⋮ GH(5) ⋮ 0 | 1 ⋮ P(1) ⋮ 0 | 1 ⋮ P(0) ⋮ 0 |
| 64 x 4 BYTES RH(7)-RH(4)=1 | 1 ⋮ 1 ⋮ 1 | 0 ⋮ 0 ⋮ 0 | 0 ⋮ 0 ⋮ 0 | 1 ⋮ 1 ⋮ 1 | 1 ⋮ BH(7) ⋮ 0 | 1 ⋮ BH(6) ⋮ 0 | 1 ⋮ BH(5) ⋮ 0 | 1 ⋮ GH(7) ⋮ 0 | 1 ⋮ GH(6) ⋮ 0 | 1 ⋮ GH(5) ⋮ 0 | 1 ⋮ P(1) ⋮ 0 | 1 ⋮ P(0) ⋮ 0 |
| 64 x 4 BYTES BH(7)-BH(4)=1 | 1 ⋮ 1 ⋮ 1 | 0 ⋮ 0 ⋮ 0 | 0 ⋮ 0 ⋮ 0 | 0 ⋮ 0 ⋮ 0 | 1 ⋮ RH(7) ⋮ 0 | 1 ⋮ RH(6) ⋮ 0 | 1 ⋮ RH(5) ⋮ 0 | 1 ⋮ GH(7) ⋮ 0 | 1 ⋮ GH(6) ⋮ 0 | 1 ⋮ GH(5) ⋮ 0 | 1 ⋮ P(1) ⋮ 0 | 1 ⋮ P(0) ⋮ 0 |
| 512 x 4 BYTES | 0 ⋮ 0 ⋮ 0 | 1 ⋮ RH(7) ⋮ 0 | 1 ⋮ RH(6) ⋮ 0 | 1 ⋮ RH(5) ⋮ 0 | 1 ⋮ BH(7) ⋮ 0 | 1 ⋮ BH(6) ⋮ 0 | 1 ⋮ BH(5) ⋮ 0 | 1 ⋮ GH(7) ⋮ 0 | 1 ⋮ GH(6) ⋮ 0 | 1 ⋮ GH(5) ⋮ 0 | 1 ⋮ P(1) ⋮ 0 | 1 ⋮ P(0) ⋮ 0 |

FIG.15

(E,O,E) RAM ADDRESS MAP

| | | | | | | | | | | | | |
|---|---|---|---|---|---|---|---|---|---|---|---|---|
| 8 x 4 BYTES<br>RH(7)-RH(4)=1, GH(7)-GH(4)=1 | 1<br>•<br>1<br>•<br>1 | 0<br>•<br>0<br>•<br>0 | 1<br>•<br>1<br>•<br>1 | 0<br>•<br>0<br>•<br>0 | 0<br>•<br>0<br>•<br>0 | 0<br>•<br>0<br>•<br>0 | 0<br>•<br>0<br>•<br>0 | 1<br>•<br>BH(7)<br>•<br>0 | 1<br>•<br>BH(6)<br>•<br>0 | 1<br>•<br>BH(5)<br>•<br>0 | 1<br>•<br>P(1)<br>•<br>0 | 1<br>•<br>P(0)<br>•<br>0 |
| 64 x 4 BYTES<br>RH(7)-RH(4)=1 | 1<br>•<br>1<br>•<br>1 | 0<br>•<br>0<br>•<br>0 | 0<br>•<br>0<br>•<br>0 | 1<br>•<br>1<br>•<br>1 | 1<br>•<br>BH(7)<br>•<br>0 | 1<br>•<br>BH(6)<br>•<br>0 | 1<br>•<br>BH(5)<br>•<br>0 | 1<br>•<br>GH(7)<br>•<br>0 | 1<br>•<br>GH(6)<br>•<br>0 | 1<br>•<br>GH(5)<br>•<br>0 | 1<br>•<br>P(1)<br>•<br>0 | 1<br>•<br>P(0)<br>•<br>0 |
| 64 x 4 BYTES<br>BH(7)-BH(4)=1 | 1<br>•<br>1<br>•<br>1 | 0<br>•<br>0<br>•<br>0 | 0<br>•<br>0<br>•<br>0 | 0<br>•<br>0<br>•<br>0 | 1<br>•<br>RH(7)<br>•<br>0 | 1<br>•<br>RH(6)<br>•<br>0 | 1<br>•<br>RH(5)<br>•<br>0 | 1<br>•<br>GH(7)<br>•<br>0 | 1<br>•<br>GH(6)<br>•<br>0 | 1<br>•<br>GH(5)<br>•<br>0 | 1<br>•<br>P(1)<br>•<br>0 | 1<br>•<br>P(0)<br>•<br>0 |
| 512 x 4 BYTES | 0<br>•<br>0<br>•<br>0 | 1<br>•<br>RH(7)<br>•<br>0 | 1<br>•<br>RH(6)<br>•<br>0 | 1<br>•<br>RH(5)<br>•<br>0 | 1<br>•<br>BH(7)<br>•<br>0 | 1<br>•<br>BH(6)<br>•<br>0 | 1<br>•<br>BH(5)<br>•<br>0 | 1<br>•<br>GH(7)<br>•<br>0 | 1<br>•<br>GH(6)<br>•<br>0 | 1<br>•<br>GH(5)<br>•<br>0 | 1<br>•<br>P(1)<br>•<br>0 | 1<br>•<br>P(0)<br>•<br>0 |

FIG.16

(O,E,E) RAM ADDRESS MAP

8 x 4 BYTES
GH(7)-GH(4)=1, BH(7)-BH(4)=1

```
1  0  1  0  0  0  0   1     1     1     1     1
·  ·  ·  ·  ·  ·  ·   ·     ·     ·     ·     ·
1  0  1  0  0  0  0  RH(7) RH(6) RH(5) P(1)  P(0)
·  ·  ·  ·  ·  ·  ·   ·     ·     ·     ·     ·
1  0  1  0  0  0  0   0     0     0     0     0
```

64 x 4 BYTES
BH(7)-BH(4)=1

```
1  0  0  1   1     1     1     1     1     1     1     1
·  ·  ·  ·   ·     ·     ·     ·     ·     ·     ·     ·
1  0  0  1  RH(7) RH(6) RH(5) GH(7) GH(6) GH(5) P(1)  P(0)
·  ·  ·  ·   ·     ·     ·     ·     ·     ·     ·     ·
1  0  0  1   0     0     0     0     0     0     0     0
```

64 x 4 BYTES
GH(7)-GH(4)=1

```
1  0  0  0   1     1     1     1     1     1     1     1
·  ·  ·  ·   ·     ·     ·     ·     ·     ·     ·     ·
1  0  0  0  RH(7) RH(6) RH(5) BH(7) BH(6) BH(5) P(1)  P(0)
·  ·  ·  ·   ·     ·     ·     ·     ·     ·     ·     ·
1  0  0  0   0     0     0     0     0     0     0     0
```

512 x 4 BYTES

(E,0,0) RAM ADDRESS
MAP

| | | | | | | | | | | | | |
|---|---|---|---|---|---|---|---|---|---|---|---|---|
| 64 x 4 BYTES RH(7)-RH(4)=1 | 1 | 0 | 0 | 0 | 1 | 1 | 1 | 1 | 1 | 1 | 1 | 1 |
| | . | . | . | . | . | . | . | . | . | . | . | . |
| | 1 | 0 | 0 | 0 | BH(7) | BH(6) | BH(5) | GH(7) | GH(6) | GH(5) | P(1) | P(0) |
| | . | . | . | . | . | . | . | . | . | . | . | . |
| | 1 | 0 | 0 | 0 | 0 | 0 | 0 | 0 | 0 | 0 | 0 | 0 |
| 512 x 4 BYTES | 0 | 1 | 1 | 1 | 1 | 1 | 1 | 1 | 1 | 1 | 1 | 1 |
| | . | . | . | . | . | . | . | . | . | . | . | . |
| | 0 | RH(7) | RH(6) | RH(5) | BH(7) | BH(6) | BH(5) | GH(7) | GH(6) | GH(5) | P(1) | P(0) |
| | . | . | . | . | . | . | . | . | . | . | . | . |
| | 0 | 0 | 0 | 0 | 0 | 0 | 0 | 0 | 0 | 0 | 0 | 0 |

FIG.18

(0,E,0) RAM ADDRESS
MAP

| | | | | | | | | | | | | |
|---|---|---|---|---|---|---|---|---|---|---|---|---|
| | 1 | 0 | 0 | 0 | 1 | 1 | 1 | 1 | 1 | 1 | 1 | 1 |
| | • | • | • | • | • | • | • | • | • | • | • | • |
| 64 x 4 BYTES BH(7)–BH(4)=1 | 1 | 0 | 0 | 0 | RH(7) | RH(6) | RH(5) | GH(7) | GH(6) | GH(5) | P(1) | P(0) |
| | • | • | • | • | • | • | • | • | • | • | • | • |
| | 1 | 0 | 0 | 0 | 0 | 0 | 0 | 0 | 0 | 0 | 0 | 0 |
| | 0 | 1 | 1 | 1 | 1 | 1 | 1 | 1 | 1 | 1 | 1 | 1 |
| | • | • | • | • | • | • | • | • | • | • | • | • |
| 512 x 4 BYTES | 0 | RH(7) | RH(6) | RH(5) | BH(7) | BH(6) | BH(5) | GH(7) | GH(6) | GH(5) | P(1) | P(0) |
| | • | • | • | • | • | • | • | • | • | • | • | • |
| | 0 | 0 | 0 | 0 | 0 | 0 | 0 | 0 | 0 | 0 | 0 | 0 |

FIG.19

(0,0,E) RAM ADDRESS
MAP

| | | | | | | | | | | | | |
|---|---|---|---|---|---|---|---|---|---|---|---|---|
| 64 x 4 BYTES GH(7)-GH(4)=1 | 1 • 1 • 1 | 0 • 0 • 0 | 0 • 0 • 0 | 0 • 0 • 0 | 1 • RH(7) • 0 | 1 • RH(6) • 0 | 1 • RH(5) • 0 | 1 • BH(7) • 0 | 1 • BH(6) • 0 | 1 • BH(5) • 0 | 1 • P(1) • 0 | 1 • P(0) • 0 |
| 512 x 4 BYTES | 0 • 0 | 1 • RH(7) • 0 | 1 • RH(6) • 0 | 1 • RH(5) • 0 | 1 • BH(7) • 0 | 1 • BH(6) • 0 | 1 • BH(5) • 0 | 1 • GH(7) • 0 | 1 • GH(6) • 0 | 1 • GH(5) • 0 | 1 • P(1) • 0 | 1 • P(0) • 0 |

FIG.20

```
              (0,0,0) RAM ADDRESS
                      MAP
                 0   1   1   1   1   1   1   1   1   1   1   1
                 .   .   .   .   .   .   .   .   .   .   .   .
512 x 4 BYTES    0  RH(7)RH(6)RH(5)BH(7)BH(6)BH(5)GH(7)GH(6)GH(5)P(1) P(0)
                 .   .   .   .   .   .   .   .   .   .   .   .
                 0   0   0   0   0   0   0   0   0   0   0   0
```

FIG.21

APPARATUS FOR ROUTING INTERPOLATOR INPUT DATA BY PERFORMING A SELECTIVE TWO'S COMPLEMENT BASED ON SETS OF LOWER AND HIGHER ORDER BITS OF INPUT DATA

RELATED APPLICATION

This application includes subject matter related to a co-pending application having U.S.P.T.O. Ser. No. 08/691,633 filed on even date herewith and incorporated by reference herein.

1. Field of the Invention

The present invention relates generally to digital data transformation and, more specifically, to generating data used for interpolation in a data transformation.

2. Background of the Invention

Colorimetry has long been recognized as a complex science. In general, it has been found possible and convenient to represent color stimuli vectors in a three-dimensional space, called tristimulus space. Essentially, as defined in 1931 by the Commission Internationale L'Eclairage (CIE), three primary colors (X, Y, Z) can be combined to define all light sensations we experience with our eyes (that is, the color matching properties of an ideal trichromatic observer defined by specifying three independent functions of wavelength that are identified with the ideal observer's color matching functions form an international standard for specifying color). The fundamentals of such three-dimensional constructs are discussed in the literature, such as *Principles of Color Technology*, by Billmeyer and Saltzman, published by John Wiley & Sons, Inc., New York, copyright 1981 (2nd. ed.) and *Color Science: Concepts and Methods, Quantitative Data and Formulae*, by Wyszecki and Stiles, published John Wiley & Sons, Inc., copyright 1982 (2d ed.), incorporated herein by reference in pertinent parts, particularly pages 119–130.

Trichromatic model systems—such as red, green, blue (RGB); cyan, magenta, yellow, (CMY); hue, saturation, value (HSV); hue, lightness, saturation (HLS); luminance, red-yellow scale, green-blue scale (La*b*); luminance, red-green scale, yellow-blue scale (Luv); YIQ used in commercial color television broadcasting; and the like—provide alternatives for the system designer. See such works as *Fundamentals of Interactive Computer Graphics*, by Foley and Van Dam, Addison-Wesley Publishing Company, incorporated herein by reference in pertinent parts, particularly pages 606–621, describing a variety of tri-variable color models.

Color transformation between model systems in digital data processing presents many problems to the original equipment manufacturer. The interpolation of data from one system to another system is difficult because the relationship between the systems are generally non-linear. Therefore, a crucial problem is the maintaining of color integrity between an original image from an input device (such as a color scanner, CRT display, digital camera, computer software firmware generation, and the like) and a translated copy at an output device (such as a CRT display, color laser printer, color ink-jet printer, and the like).

For example, computer artists want the ability to create a color image on a computer video and have a printer provide the same color in hard copy. Or, an original color photograph may be digitized with a scanner; resultant data may be transformed for display on a video monitor or reproduced as a hard copy by a laser, ink-jet or thermal transfer printer. As discussed in the reference materials cited, colors can be constructed as renderings of the additive primary colors, red, green, and blue (RGB), or of the subtractive primary colors, cyan, magenta, yellow and black (CMYK). A transformation may require going from an RGB color space, for example, a computer video monitor, to a CMYK color space, for example, a laser printer hard copy. A transformation from one color space to another requires complex, non-linear computations in multiple dimensions. Some transform operations could be accomplished by multiplying a matrix of conversion constants by the set of values in the RGB color space which are to be transformed. Computation of the matrix of conversion constants is required for each set of values in the RGB color space which are to be transformed.

However, a difficulty in this method of color space conversion results from imperfections in the dyes, phosphors, and toners used for the production of the colors. An additional complication is that different types of media produce different color responses from printing with the same mixes of colorants. As a result, a purely mathematical color space conversion method does not provide acceptable color reproduction.

It has been recognized that superior results in color space conversion are obtained using a look up table scheme based upon a set of empirically derived values. Typically the RGB color space used for video displays uses eight bits to represent each of the primary colors, red, green, and blue. Therefore, twenty four bits are required to represent each picture element. With this resolution, the RGB color space would consist of $2^{24}$ or 16,777,216 colors. Performing a color space conversion from each of these points in the RGB color space to generate the four CMYK (to maintain black color purity in printing, a separate black is usually provided rather than printing with all three of cyan, magenta, and yellow colorants to generate what is commonly known as process black) color space components would require a look-up table with $2^{26}$ or 67,108,864 bytes of data. The empirical construction of a look-up table with this number of entries is too difficult and the hardware implementation cost of a color space converter employing this number of entries is prohibitive.

In making the transform from one color space to another, a number of interpolation schemes well known in the field of color space conversion may be employed. Methods of performing color space conversion using trilinear interpolation, prism interpolation, and tetrahedral interpolation are disclosed in the published article PERFORMING COLOR SPACE CONVERSIONS WITH THREE DIMENSIONAL LINEAR INTERPOLATION, JOURNAL OF ELECTRONIC IMAGING, July 1995 Vol. 4(3), the disclosure of which is incorporated herein by reference.

In a prior art (U.S. Pat. No. 3,893,166 issued to Pugsley) trilinear interpolation applied to a conversion between color spaces, for example from the RGB color space to the CMYK color space, the three groups of eight bits typically used to represent the primary colors may each be partitioned into a set of four higher order bits (e.g. RH, GH, BH) and a set of four lower order bits (e.g. RL, GL, BL). The three sets of higher order bits are used to form a set of addresses which provide access to an array of corresponding values in the color space to which the conversion is directed. An array of values exits for each of the color dimensions in the color space to which the conversion is directed. For example, a conversion to the CMYK color space would require four arrays, one for each of the color dimensions. With four bits selected for each of RH, GH, and BH there are $2^{(4+4+4)}$= 4096 locations in each of the four arrays. Each of these locations contains a value for use in the interpolation necessary for accomplishing a color space conversion. The sets of four lower order bits in each of RL, GL, and BL are used for interpolating between the values specified by the sets of four higher order bits in each of RH, GH, and BH.

Each of the four arrays of values can be viewed as a cubic lattice in three dimensional space. To accommodate the cases in which at least one of the RH, GH, or BH lies on an outer boundary of the array corresponding to the dimension of the output color space to which the conversion is directed, each of the arrays must be expanded by one vertex on each of the three axes. Stated differently, to have the capability to interpolate over 16 intervals along each of the three axes requires 17 vertices in each of the dimensions. A cubic lattice having 17 vertices in each of the dimensions contains a total of 4913 vertices. Each of the vertices internal to the cubic lattice is common to eight cubes. Each cube is formed from eight vertices. With this perspective in mind, the conversion of a twenty four bit representation of an RGB color space value to one of the dimensions of the CMYK color space can be regarded as determining a location in the volume enclosed by a cube in the cubic lattice. The color space values represented by the eight vertices of the cube are used in determining this location. The twelve bits formed from RH, GH, and BH are used as an address to locate one vertex of the cube in the cubic lattice. The addresses of the remaining seven associated vertices of the cube are determined by forming the remaining possible combinations of the values of RH, GH, BH, RH+1, GH+1, and BH+1.

The twelve bits formed from RH, GH, and BH serve to select an entry vertex into the cubic lattice to define a cube within which an interpolation will be performed. The seven other vertices which make up the cube are identified by their spatial relationship to the entry vertex. The entry vertex of the cube will be the one vertex of eight vertices forming the cube located the closest to the origin of the three dimensional space containing the cubic lattice. By defining the spatial relationship of the entry vertex to the remaining seven vertices of the cube in this manner, the vertices of selected cubes will have the same relative orientation in the cubic lattice. The values corresponding to the vertices of the cubic lattice are typically stored in a memory and accessed using the addresses formed from RH, GH, and BH. For correctly performing the interpolation, the eight values must be presented to the inputs of the interpolator in a manner so that the corresponding spatial relationship between the vertices in the cube is preserved regardless of the vertex selected as the entry vertex into the cubic lattice. In the co-pending patent application filed by Jones (U.S.P.T.O. Ser. No. 08/375,096) a multiplexer is used to connect the outputs of the memory to the interpolator inputs in a manner to correctly perform the interpolation. However, implementation of this multiplexer requires considerable hardware and the multiplexer contributes to delays in the color space conversion process. An improvement in the conversion speed of the color space converter and a reduction in hardware complexity could be achieved by eliminating the multiplexer and using an alternate method to route the interpolator input data.

SUMMARY OF THE INVENTION

As a solution to this problem, an apparatus for routing interpolator input data used for a transformation of input data values having n components to output data values each having i components has been developed. The n components are represented by n sets of bits which are each partitioned to form n sets of higher order bits and n sets of lower order bits. The input data values may represent an input color space, such as a RGB color space. The output data values may represent an output color space, such as a CMYK color space.

The apparatus includes a means for performing a selective two's complement, such as a selective two's complementer, arranged for receiving the n sets of lower order bits and a least significant bit from each of the n sets of higher order bits. The apparatus also includes a means for interpolating, such as a hardware interpolator, coupled to the means for performing a selective two's complement.

By selectively performing a two's complement on the n lower order sets of bits depending upon the state of the least significant bit from the corresponding higher order set of bits and using the results in the means for interpolating, the interpolator input data is routed to the correct computational block within the interpolator.

BRIEF DESCRIPTION OF THE DRAWINGS

A more thorough understanding of the invention may be had from the consideration of the following detailed description taken in conjunction with the accompanying drawings in which:

FIG. 10 is a table showing the interpolator inputs to which the outputs of the eight memory banks should be logically connected when considering, successively, each of the eight vertices of a cube as the entry point into the cubic lattice.

FIGS. 14–21 are tables of the addresses generated to access the interpolator input data stored in the eight memory banks.

DETAILED DESCRIPTION OF THE PREFERRED EMBODIMENTS

Although the exemplary embodiment of the apparatus for routing interpolator input data will be discussed in the context of a color space conversion from an RGB color space to a CMYK color space, it will be recognized by one skilled in the art that the disclosed apparatus for routing interpolator input data is useful for other applications requiring the use of an interpolator to perform a data transformation. Furthermore, while the operation of the exemplary embodiment will be described in terms of a three dimensional space and an interpolator using eight interpolator input data values to define the region in which interpolation is performed, it will be recognized that this apparatus for routing interpolator input data may be expanded to operate in a n-dimensional space. Additionally, while the exemplary color space converter uses 14 input bits to generate the interpolator input data used for the color space conversion, the color space converter may be configured to use m bits for generating the necessary interpolator input data. Furthermore, while a description is provided of an exemplary embodiment which operates in performing a transformation from a three dimensional space color space to a four dimensional color space, it should be recognized that no limitation in the scope of the claims is intended by using this example. Throughout this specification, the term "interpolator input data"refers to the data set used by an interpolator to define the bounds of the region in which the interpolation is performed. The look-up table used for the color space conversion is formed from the interpolator input data values.

Figure 1:
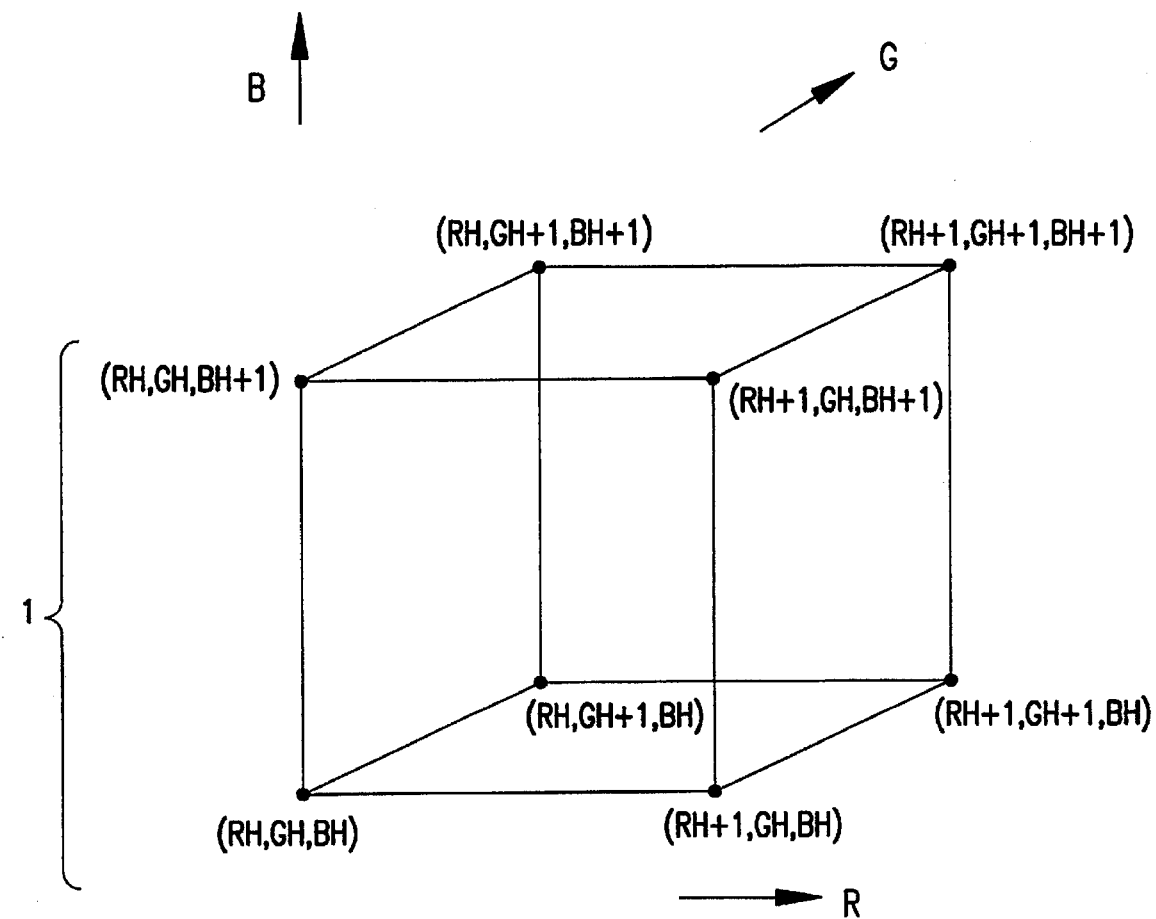
FIG. 1 is a drawing showing a single cube from a cubic lattice. The relative addresses of the vertices are shown by each corresponding vertex.

Referring particularly to FIG. 1, shown is a single exemplary cube 1 from the previously mentioned cubic lattice. The locations of each of the vertices of the cube 1 in a cubic lattice can be specified by a set of address vectors, RH, GH, and BH. The set address vectors which address the locations of the cube vertices containing the corresponding values may be represented as shown in FIG. 1. Each of the addresses of the vertices shown have address vectors which, for at least one of the components, differ in their values by 1. Any set of eight vertices forming a cube in the cubic lattice can be addressed in this manner.

Figure 2:
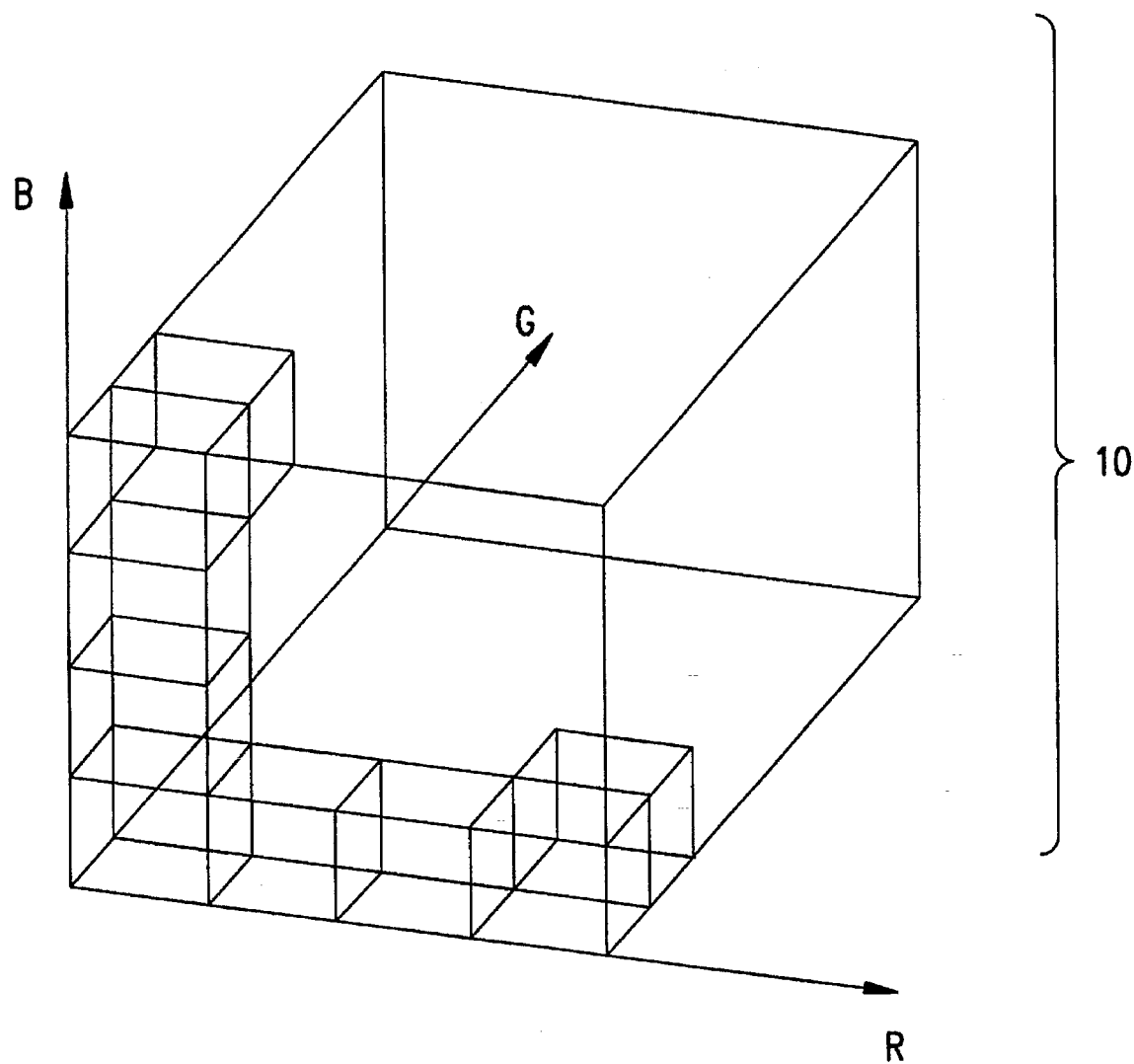
FIG. 2 is a drawing showing a section of the cubic lattice representing the values used for conversion from the RGB color space to the CMYK color space. The axes are labeled to indicate to which of the components of the RGB color space values used to address locations in the cubic lattice they correspond.

The cubic lattice 10, a portion of which is shown in FIG. 2, is formed from a three dimensional matrix of vertices. Each of the vertices in the cubic lattice 10 has a corresponding address for the color space value represented by the vertex. The addresses of the locations having the values represented by the vertices are determined by the values of RH, GH, and BH. Each of the dimensions of the cubic lattice which correspond to R, G, and B are labeled in FIG. 2. It will be recognized by inspection of the FIG. 2, that vertices are shared between the cubes in the cubic lattice 10.

Figure 3:
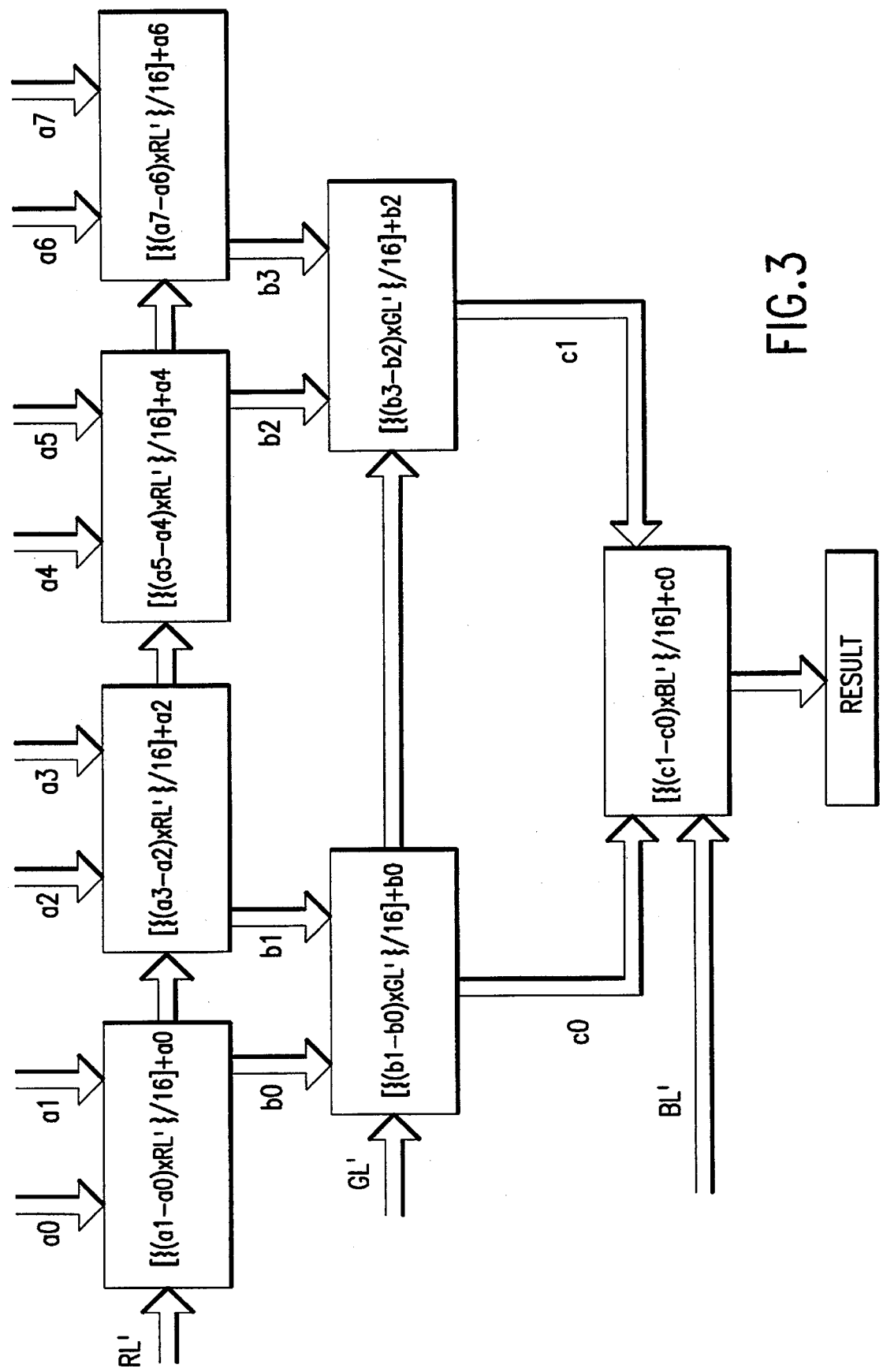
FIG. 3 is a block diagram representation of the interpolation process, including the formulas used during each of the steps.

In performing a color space conversion from the RGB color space to the CMYK color space, the values of RH, GH, and BH are used to address a value corresponding to a vertex in the cubic lattice. Seven associated values, corresponding to the remaining seven vertices of the cube selected by the values RH, GH, and BH, are used to perform the interpolation. Referring to FIG. 3, the interpolation is performed using the formulas contained in the interpolator blocks. The values of RL', GL', and BL' (the relationship between RL, GL, BL, and RL', GL', BL' will be explained later) are used, according to the formulas shown in the blocks in FIG. 3, by the interpolator to compute the location within the corresponding cube which corresponds to one of the dimensions in the CMYK color space. This location is the output of the interpolator indicated by the block labeled "RESULT" in FIG. 3. The eight values associated with the vertices of the selected cube are connected to the inputs of the interpolator as shown in FIG. 3.

One skilled in the art will recognize that the apparatus for generating interpolator input data of this embodiment is compatible with interpolation processes other than a cubic interpolation. A tetrahedral interpolation uses 4 values to bound the region over which interpolation is performed and a prismatic interpolation uses 6 values. Each of the cubes can be partitioned into either tetrahedrons or prisms with selected vertices of cube serving as the vertices of the tetrahedrons or the prisms. By selecting the appropriate 4 or 6 values from the eight values accessed by the apparatus for generating interpolator input data, the desired tetrahedron or prism can be formed to perform tetrahedral or prismatic interpolations. Determination of which of the eight values accessed by the apparatus for generating interpolator input data will be used to perform a tetrahedral or prismatic interpolation can be done while the memory containing the interpolator input data values is accessed.

Figure 4A:
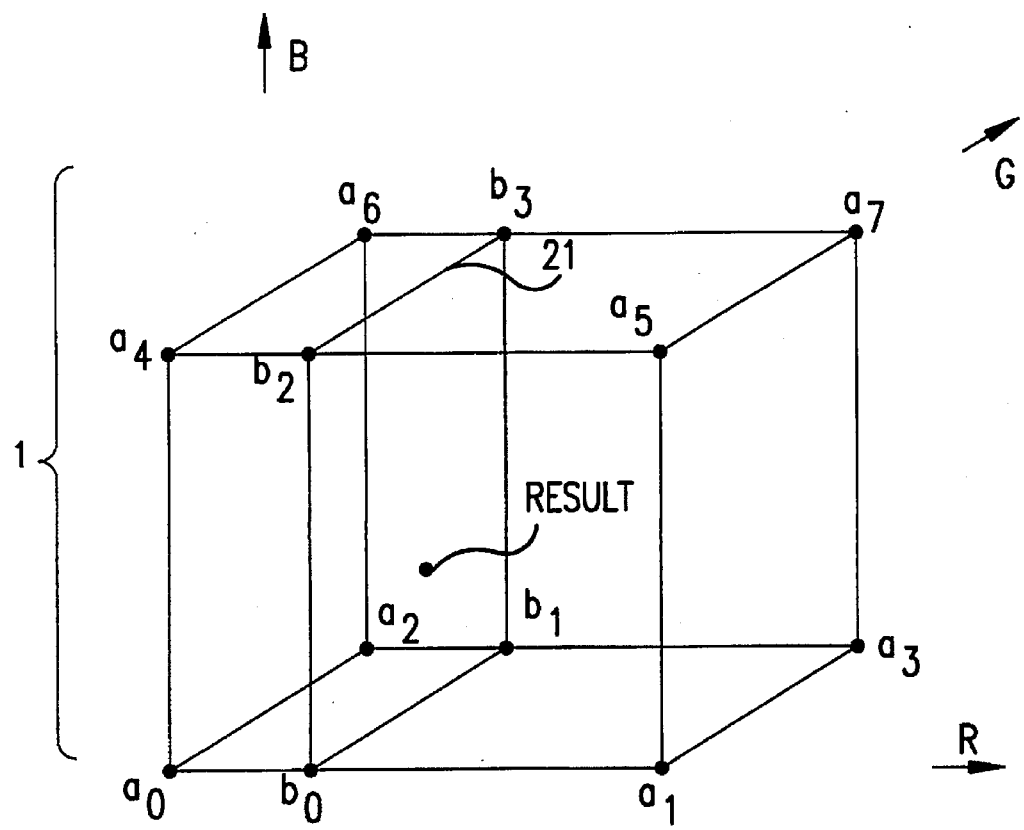
FIG. 4 is a graphical representation of the interpolation process using the vertices of a cube in the cubic lattice to represent the interpolator input data values.
Figures 4B, 4C:
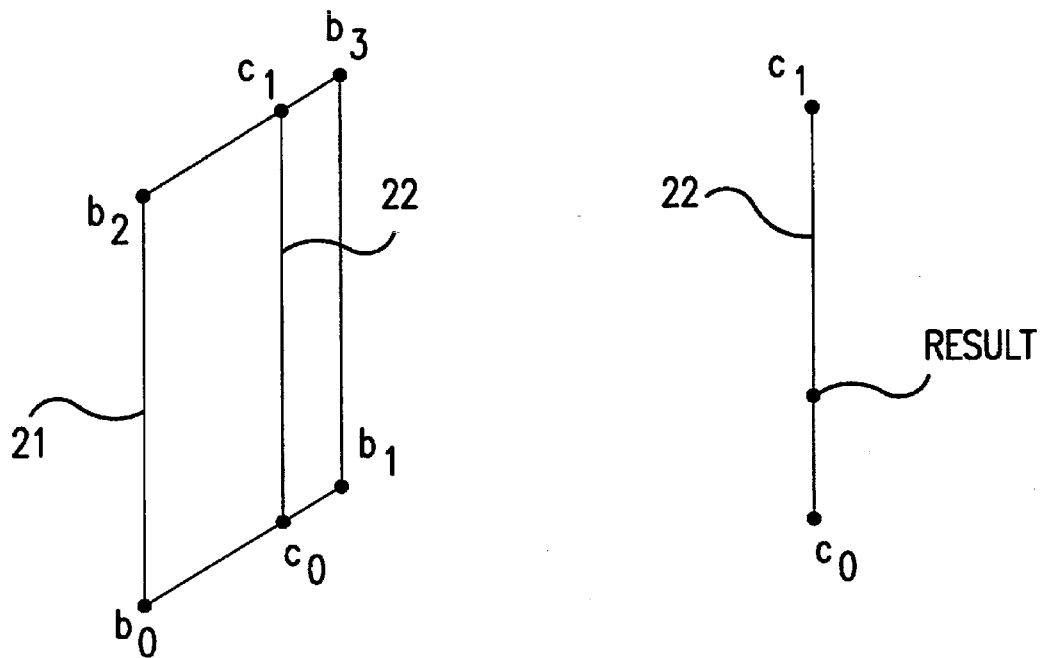

Shown in FIG. 4 is a graphic representation of the steps in the interpolation process which are accomplished using the interpolator of FIG. 3. An addressed cube 1 of the cubic lattice 10 is shown. The top row of interpolation calculations in FIG. 3 uses the RL' set of bits and the eight values a0–a7 to generate four values b0–b3 which define the plane 21 shown. These four points b0–b3 in this plane correspond to the four values b0–b3 resulting from the top row of interpolation calculations. The eight values a0–a7 correspond to the eight vertices of the addressed cube 1. The GL' set of bits along with the four values b0–b3 from the top row are used in the second row of interpolation calculations to compute two values c0–c1 which define the line 22 shown. The two points c0–c1 correspond to the two values c0–c1 resulting from the second row of interpolation calculations. The BL' set of bits along with the two values c0–c1 from the second row are used in the third row of interpolation calculations to compute the result. The point labeled "RESULT" corresponds to the result of the interpolation calculation and is located in the volume enclosed by the cube 1.

It should be noted that while for the explanation of the preferred embodiment of the apparatus for generating interpolator input data the twenty four bit RGB color space value is partitioned into twelve bits of RH, GH, and BH, and twelve bits of RL, GL, and BL, other partitions are possible. For example, the partition of the twenty four bits could be made so that fifteen bits are dedicated to RH, GH, and BH, and nine bits are dedicated to RL, GL, and BL. Additionally, it is not necessary that the bits designated as higher order or lower order be equally distributed between RH, GH, BH and RL, GL, BL respectively. For example, if fifteen bits are designated as higher order bits, six bits may be assigned to RH, four bits to GH, and five bits to BH. By selecting partitions having greater or fewer numbers of higher order bits, a trade-off is made between the size of the look-up table and the accuracy of the interpolation for the color space conversion.

Figure 5:
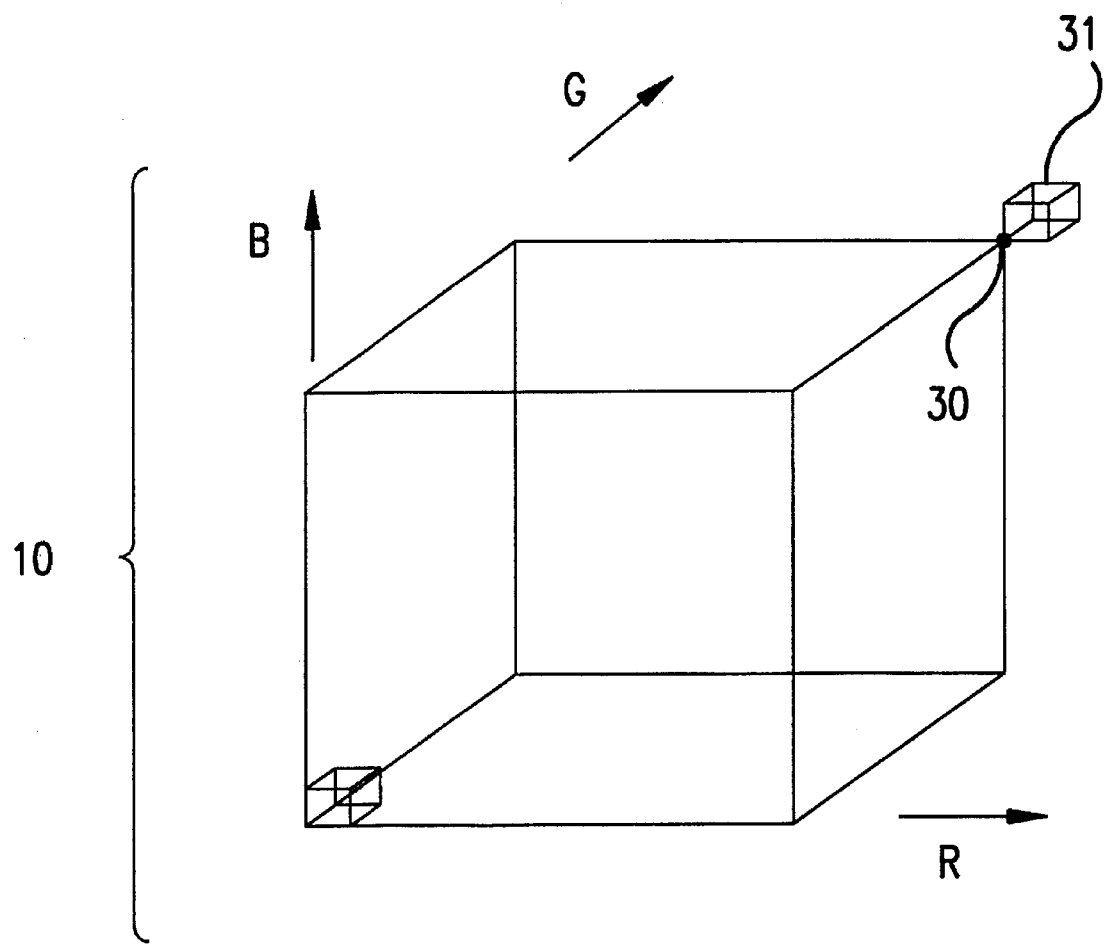
FIG. 5 is a graphic representation of a difficulty encountered in an interpolation which uses 16 vertices in each of the RGB color space dimensions.

The cubic lattice 10 formed from the vertices is a representation of the array of values in a look-up table storing data used for interpolation. In a color space represented by a cubic lattice 10 having three dimensions each with sixteen vertices, a difficulty occurs when attempting an interpolation using a vertex located at the outer boundary of the RGB color space in at least one of the dimensions. This would occur when at least one of RH, GH, or BH has the binary value of 1111. In these cases, the vertex addressed would be located on the outer boundary of at least one of the dimensions of the cubic lattice 10 representing the color space. The interpolator input data could not be generated because, depending upon the specific location of the addressed vertex on the outer boundary, interpolator input data values corresponding to the seven associated vertices required for interpolation exist. An example of a cube having a vertex 30 located on a boundary of the cubic lattice 10 representing the color space with the remainder of the cube 31 outside of the color space is shown in FIG. 5 with RH=GH=BH=1111.

To address this problem the cubic lattice representing the look-up table data is expanded to have 17 vertices in each of the three color space dimensions R, G, and B. This results in a look-up table having $17^3=4913$ entries for each dimension of the color space to which the conversion is performed. For conversion to a CMYK color space, the look-up table would require four times this number of values or 19,652 values. To allow addressing of each of the values represented by the vertices in the expanded 4913 vertex cubic lattice, the addresses used to address data stored in the look-up table must have sufficient numbers of bits to address the 19,652 values in the look-up table. It will be recognized that the expansion of the representative cubic lattice may be done for different partitions of the twenty four bits between the higher order bits and the lower order bits and for unequal distribution of the higher order bits between RH, GH, and BH.

Additionally, the expansion of the data in the look-up table may be done for the general case of a transformation from input data values each having n components to output data values each having i components. In general for m higher order bits divided among the n components of the input data values according to $m_1+m_2+ \ldots +m_n=m$, the number of interpolator input data values in the expanded look-up table would be calculated as.

$$\{[2^{m_1}+1] \times [2^{m_2}+1] \times \ldots \times [2^{m_n}+1]\} \times i =$$
look-up table values    equation 1:

There are a number of different options possible for the configuration of the memory and the interpolation process. Selection of an option will depend upon the desired trade-off between the speed with which the color space conversion is performed and the complexity of the hardware. For example, the memory which stores the interpolator input data values could store the values for performing conversion to a single one of the i dimensions of the output color space or it could store the interpolator input data values for all of the i dimensions. Additionally, the interpolator input data values stored in the memory could be configured so that a single one of the required eight values used for conversion to one of the i dimensions of the output color space is accessed at a time, or all eight values are accessed substantially simultaneously. Furthermore, depending upon the selected memory configuration, a single interpolator may be used or an interpolator may be used for each of the i dimensions of the output color space.

A first option, which would require the minimum hardware, is to store the interpolator input data values for conversion to a single dimension of the output color space in a single memory in consecutive locations. In this case, the required number of interpolator input data values contemporaneously stored in memory would be calculated as: $\{[2^{m_1}+1] \times [2^{m_2}+1] \times \ldots \times [2^{m_n}+1]\}$. With n equal 3 and $m_1=m_2=m_3=4$ this would total to 4913 storage locations required for the memory. The memory would then be accessed eight separate times to obtain the eight values used for interpolation. A single interpolator would load the interpolator input data values as they are output from the memory and perform the interpolation after all eight of the values have been loaded. Before color space conversion is performed for each of the four dimensions of the output color space, the memory would be loaded with the set of interpolator input data corresponding to the dimension of the output color space to which the conversion is directed. Although this option requires the minimum hardware, it yields the slowest conversion speed of the possible options.

A second option would involve storing the interpolator values necessary to perform the interpolation for one of the dimensions of the output color space in memory so that all eight of the values necessary for conversion of one of the input data values are accessed and output to the interpolator substantially simultaneously. To accomplish this, the memory would be divided into eight separate banks with each bank storing one of the eight interpolator input data values. This second option would use a single interpolator and the memory may either store the interpolator input data values for all of the i dimensions or only for a single dimension.

A third option would store the interpolator input data values used for conversion to all i dimensions of the output color space in memory so that all eight interpolator input data values for each of the i dimensions could be accessed substantially simultaneously. Each of the i sets of eight interpolator input data values would be loaded into one of i interpolators so that the color space conversion to each of the i dimensions of the output color space is performed substantially simultaneously. This third option achieves the greatest conversion speed but requires the most hardware. Other possible combinations of memory configurations and interpolation processes are possible.

The preferred embodiment of the apparatus for generating interpolator input data uses eight separate banks of static random access memory (SRAM) each containing four sets of values, corresponding to the vertices in four cubic lattices, for conversion to each of the dimensions of the CMYK color space. Other types of memory, such as dynamic random access memory (DRAM), read only memory (ROM), or flash memory may be used instead of SRAMs. For the case in which volatile memory is used, the eight memory banks are preloaded with the interpolator input data prior to the beginning of the color space conversion. Each memory bank provides one of the eight values corresponding to the vertices of a cube for one of the dimensions of the CMYK color space. The memory contains the values for all four of the CMYK color space dimensions, but the set of values for each of the four dimensions is accessed only when an interpolation is performed for the corresponding dimension of the color space. This approach is well suited for a color print engine which sequentially prints the color planes of the image.

Figure 6:
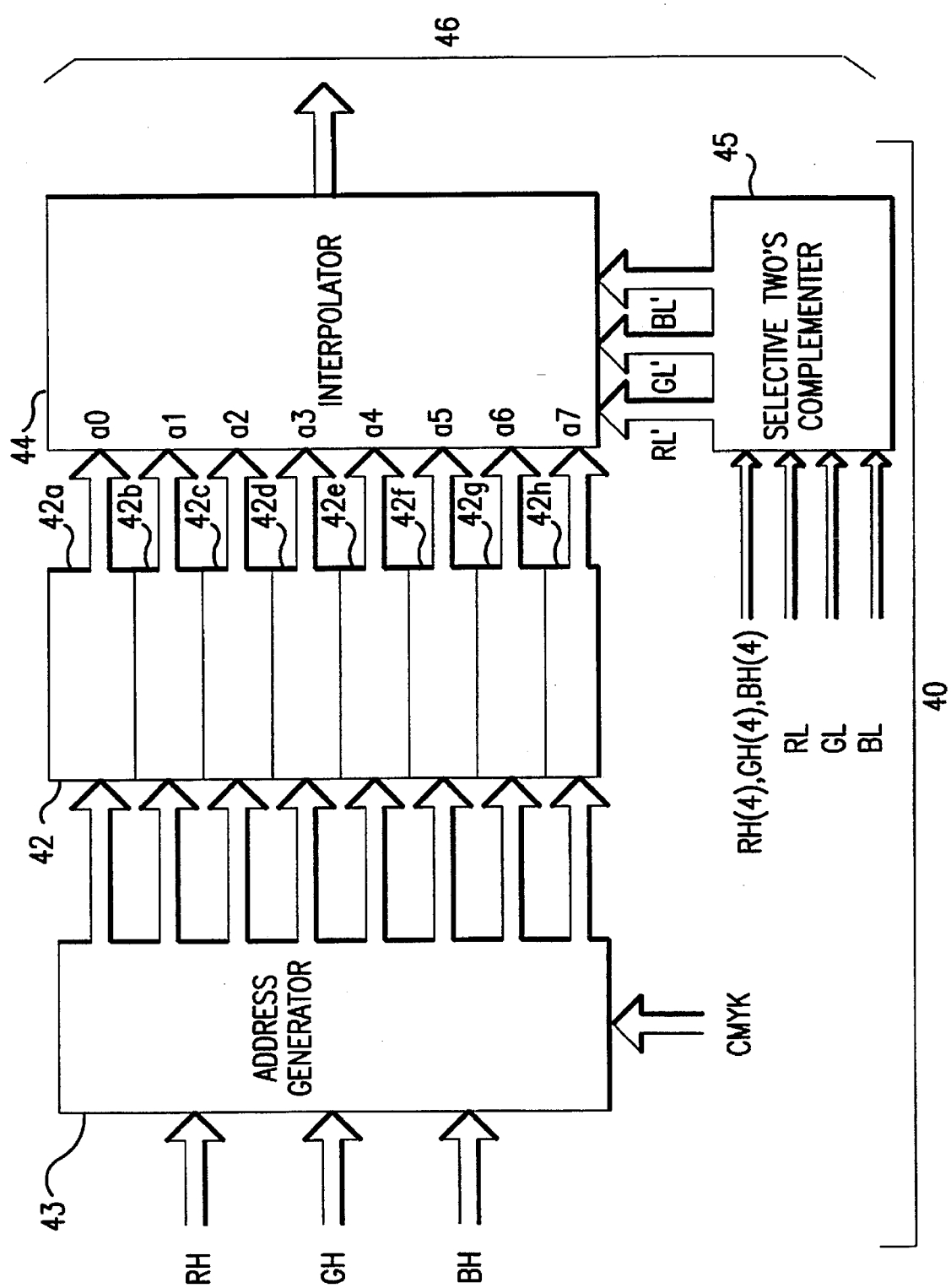
FIG. 6 is a block diagram of a color space conversion apparatus containing an embodiment of the apparatus for routing interpolator input data.

Shown in FIG. 6 is block diagram of a color space conversion apparatus 40 including the apparatus for routing interpolator input data 46. Included in the apparatus for routing interpolator input data 46 are a selective two's complementer 45 and hardware interpolator 44. Included in the color space conversion apparatus are a memory 42 and an address generator 43. The memory 42, includes eight separate banks 42a–42h for storing the look-up table values. Each of the memory banks 42a–42h includes a memory address input and a memory data output. The inputs to the address generator 43 include the three sets of higher order bits RH, GH, and BH from a twenty four bit RGB color space value and two CMYK bits which select one of the CMYK dimensions for the color space for conversion. In general, j bits may be used to select one of an arbitrary number of dimensions in the output color space. In the preferred embodiment, each of RH, GH, and BH are formed from four bits. Each of the address outputs of the address generator 43 include eight sets of twelve bits, one for each of the eight memory banks 42a–42h. The memory data outputs of the memory 42 include eight sets of eight bits (one set of eight bits for each of the eight memory banks 42a–42h). Each of these eight sets of bits is coupled to one of the eight interpolator inputs a0–a7 of the hardware interpolator 44. The three sets of lower order bits RL, GL, and BL as well as the least significant bit of the three sets of higher order bits RH, GH, and BH are inputs to the selective two's complementer 45 which selectively generates the two's complement of RL, GL, and BL. The output of the selective two's complementer 45, RL', GL', and BL' are input to the hardware interpolator 44.

Each of the eight sets of twelve bits output from the address generator 43 include two bits which are used for selection of one of four sets of look-up table values stored in memory 42 which correspond to one dimension of the CMYK color space. The remaining eight sets of ten bits are used to select vertices in the cubic lattice corresponding to the dimension of the CMYK color space to which the conversion is directed. With twelve bits going to each of the eight memory banks 42a–42h there is the capability of addressing $2^{12}$=4096 locations in each of the eight memory banks 42a–42h, for a total of 32,768 locations. However, as it was shown earlier, it is not necessary that memory 42 contain 32,768 locations to perform a RGB to CMYK colors space conversion using an expanded cubic lattice with 17 vertices for each dimension of the cubic lattice.

The locations in memory 42 correspond to the addresses of the vertices in four cubic lattices, one cubic lattice for each dimension of the CMYK color space to which the conversion is directed. The locations will be partitioned between each of the eight memory banks 42a–42h so that access to the eight values associated with the vertices of any cube in the cubic lattice for any of the four dimensions can be performed by substantially simultaneously accessing each of the eight memory banks 42a–42h once. In this context, the term "substantially simultaneously" refers to the access of the eight values at approximately the same instant within the inherent variability in the memory access times between each of the memory banks 42a–42h. The partitioning of the locations in memory 42 determines the required set of outputs of the address generator in response to the inputs RH, GH, and BH and the two bits used to select the color or space conversion dimension.

A concept of the evenness or oddness of the address corresponding to a vertex in the cubic lattice is used to assign the corresponding value for storage in a location in one of the eight memory banks 42a–42h. Referring to FIG. 1, the cube 1 is shown with the addresses corresponding to each of the vertices. The set of relative addresses for the eight vertices includes: {RH, GH, BH,} {RH, GH+1, BH} {RH, GH, BH+1} {RH, GH+1, BH+1} {RH+1, GH, BH} {RH+1, GH, BH+1} {RH+1, GH+1, BH} {RH+1, GH+1, BH+1}. An address to a vertex in the cubic lattice formed from RH, GH, and BH serves as an entry address into the cubic lattice to generate the eight values associated with the eight vertices of a cube in the cubic lattice. In response to an entry address of a vertex in the cubic lattice, the address generator 43 generates the eight addresses corresponding to the above-listed group of relative addresses so that the eight corresponding values can be loaded from memory 42 into the hardware interpolator 44.

A cubic lattice having 17 vertices in each of its three dimensions can have each of its vertices uniquely labeled so that the vertex at the origin has a label of (0,0,0) and the vertex at the greatest distance from the origin has a label of (16,16,16). Each of the vertices of the cubic lattice can be categorized according to the oddness or evenness of its components. For example, the vertex with the label (1,2,3) would be categorized as (O,E,O). It will be recognized that for any set of eight relative addresses corresponding to the eight vertices of a cube in the cubic lattice, each of the vertices will have a unique categorization relative to the other vertices with respect to the evenness or oddness of the associated label. That is, each vertex in the cubic lattice will have one of the following categorizations with respect to evenness or oddness of its associated address: (E,E,E), (E,E,O), (E,O,E), (O,E,E), (E,O,O), (O,E,O), (O,O,E), (O,O,O).

For a cubic lattice having 17 vertices in each of three axes with the labeling of the vertices of each dimension going from 0 to 16, the number of vertices included in each the eight evenness and oddness categorizations can be computed. For integers ranging from 0 to 16, there are nine even values (0, 2, 4, 6, 8, 1 0, 12, 14, 16) and eight odd values (1, 3, 5, 7, 9, 11, 13, 15). The formula for computing the total number of memory locations which must be allocated to the eight categories of evenness and oddness is:

(# of even or odd)×(# of even or odd)×(# of even or odd)×(# of dimensions)=(# of output color space dimensions). equation 2

Applying this formula to each of the evenness and oddness categories possible for the address corresponding to the vertices in a cubic lattice used in a conversion to a CMYK color space (# of dimensions=4) yields the results shown in Table 1.

TABLE 1

| ADDRESS CATEGORIZATION | NUMBER OF MEMORY LOCATIONS |
| --- | --- |
| E,E,E | 2916 |
| E,E,O | 2592 |
| E,O,E | 2592 |
| E,O,O | 2304 |
| O,E,E | 2592 |
| O,E,O | 2304 |
| O,O,E | 2304 |
| O,O,O | 2048 |

The sum of the numbers of memory locations in the table for each category equals 19,652, which, as was shown earlier, is the number of memory locations required for a color space conversion to all dimensions of the CMYK color space. As was mentioned earlier, 12 bits are sufficient to address all the memory locations in each of the eight memory banks. However, the memory bank categorized as (O,O,O) requires only 11 bits to access its 2048 storage locations. Because of this, only 11 bits are used to access the storage locations for the (O,O,O) memory bank.

By assigning the value associated with each vertex to one of the eight memory banks 42a–42h based upon the evenness and oddness categorization, a partition is formed which will allow any eight values corresponding to the eight vertices of a cube in the cubic lattice to be loaded into the hardware interpolator 44 with a single simultaneous access to each of the eight memory banks 42a–42h. With twelve address bits provided to each of the eight memory banks 42a–42h, there is a sufficient number of bits to address 4096 memory locations for each one of the eight memory banks 42a–42h for a total of 32,768 memory locations. However, the eight outputs of the address generator 43 generate addresses for only the 19,652 locations in the eight memory banks 42a–42h corresponding to the values in the expanded look-up table.

In the preferred embodiment, color space conversion apparatus 40 is implemented entirely on an application specific integrated circuit (ASIC). This implementation requires that the layout of memory 42 minimize the usage of die space on the ASIC. Seven of the eight memory banks 42a–42h must store a number of bytes in between the closest standard RAM sizes of 2048 bytes and 4096 bytes. The RAM corresponding to those addresses having an (O,O,O) categorization must store 2048 bytes. By using custom sized RAMs for the seven of the eight memory banks 42a–42h which must store non-standard numbers of bytes, more efficient utilization of ASIC die space can be achieved.

Figure 13:
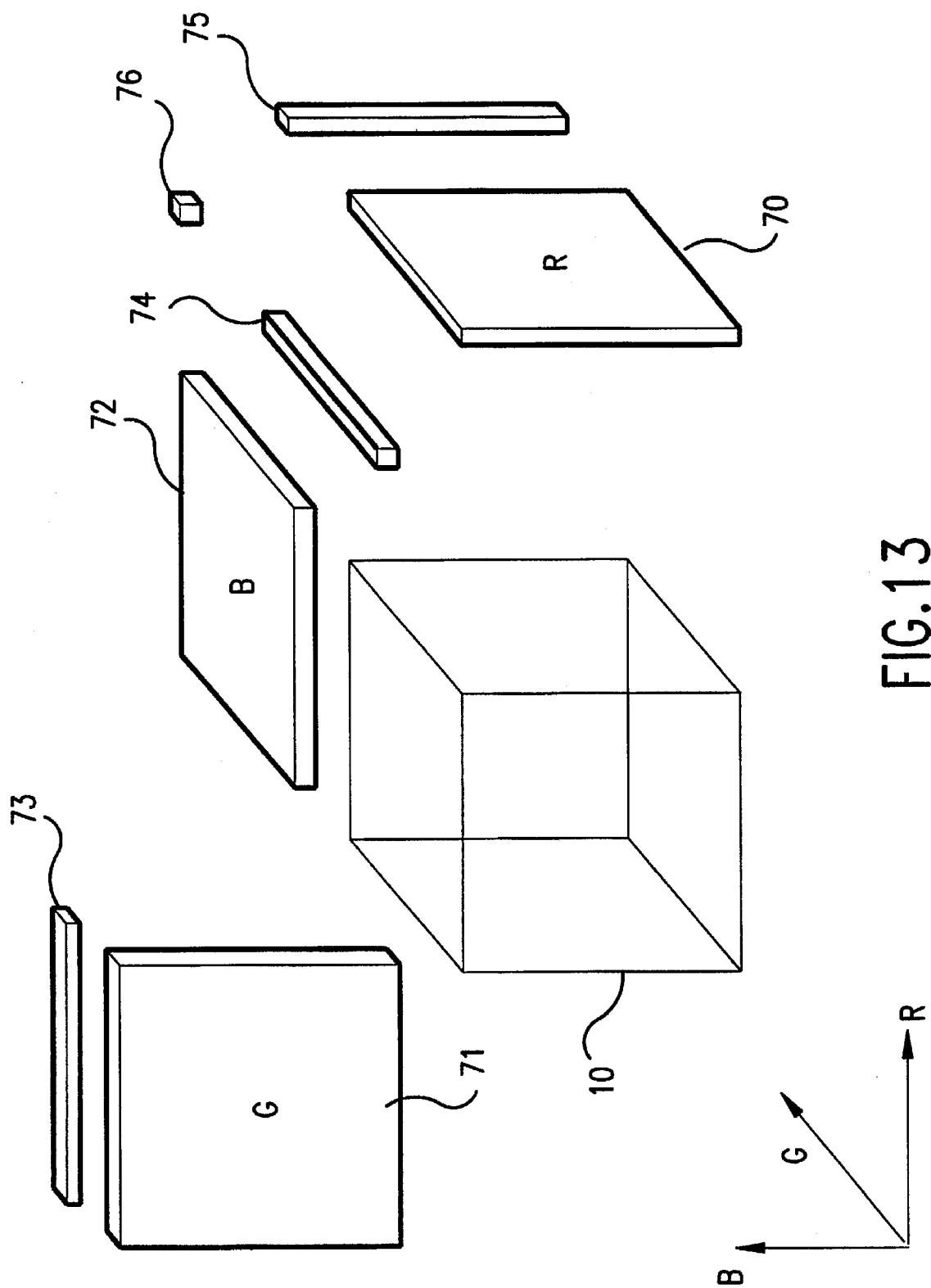
FIG. 13 is a drawing of an expanded cubic lattice showing the portions of the cubic lattice which represent the additional data values included in an expanded look-up table.

FIG. 13 illustrates a partition of the cubic lattice representing the data values in the expanded look-up table. The cubic lattice 10, having 16 vertices in each of thee R, G, and B dimensions, represents 4096 data values. The R face 70 represents the 256 data values associated with the expansion of the cubic lattice in the R dimension by one vertex. Similarly, the G face 71 and the B face 72 also represent 256 data values each resulting from expansion of the cubic lattice 10 in the G and B dimensions by one vertex, respectively. The BG 73, RB 74, and RG 75 "bars" (the BG, RB, and RG designations originate from the location of the bars at the intersections of the respective faces) represent edges which lie at the intersection of the R, G, and B faces. Each of these bars represents 16 data values in the expanded look-up table. The RGB cube 76 represents the data value associated with the vertex having the label (16, 16, 16). As it should, the number of these data values for the 16 vertex/axis cubic lattice (4096), the R face (256), the G face (256), the B face (256), the BG bar (16), the RB bar (16), the RG bar (16) and the RGB cube (1) sum totals to 4913. The memory banks 42a–42h store data values for four of these expanded cubic lattices, one for conversion to each dimension of the CMYK output color space.

Address generator 43 allows the use of the custom sized RAMs for the eight memory banks 42a–42h. Address generator 43 maps the 12 bit concatenated RH, GH, and BH value and the two CMYK selection bits into eight twelve bit addresses, one for each of the eight memory banks 42a–42h. The four higher order bits for each of the dimensions of the RGB color space are designated from most significant to least significant as: RH(7), RH(6), RH(5), RH(4), GH(7), GH(6), GH(5), GH(4), BH(7), BH(6), BH(5), BH(4). Shown in FIGS. 14 through 21 are a series of tables which show the range of address values generated for each of the eight memory banks 42a–42h. The tables categorize the generated addresses based upon the portions of the expanded cubic lattice shown in FIG. 13 which contain the data values addressed. The tables also show which of the higher order bits are used to determine addresses within each of the categories. As is indicated in the tables, the higher order bits of the dimensions of the RGB input color space which are not directly used to generate the addresses are used to select the category. The bits of the addresses designated as "P(0)" and "P(1)" represent the CMYK selection bits. One way in which the P(0) and P(1) bits may be assigned to represent each of the dimensions of the output color space is shown below:

TABLE 2

| P(1) P(0) | OUTPUT COLOR SPACE DIMENSION |
| --- | --- |
| 00 | Yellow |
| 01 | Magenta |
| 10 | Cyan |
| 11 | Black |

The methods used to design address generator 43 to generate the addresses in the tables of FIGS. 14 through 21 are well known to one of ordinary skill in the art of digital design.

The hardware interpolator 44 performs the interpolation on the values represented by the eight vertices of the cube as shown in FIG. 3. It will be understood by one skilled in the art that presentation of the values from the outputs of the eight memory banks 42a–42h to the eight inputs of the hardware interpolator 44 must be done with regard to the location of the vertex in the cube to which the values correspond, to obtain the correct output from the hardware interpolator 44. The method of design of hardware interpolator 44 is well known to one skilled in the art of digital design.

The block diagram of the interpolation process shown in FIG. 3 is that of a parallel cascade interpolator. However, hardware interpolator 44 may be of the parallel cascade or the serial iterative type. The parallel cascade type uses a hardware computation block for each computation in the interpolation process to perform the interpolation more rapidly at the expense of increased hardware requirements. The serial iterative type uses a single hardware computation block repeatedly so that it requires less hardware at the expense of decreased computation speed. In the preferred embodiment, a single parallel cascade interpolator is used to perform the interpolation computations for each of the four dimensions of the output CMYK color space a single dimension at a time. Alternatively, the color space conversion may be performed more rapidly by using four interpolators to perform the interpolation for each of the dimensions substantially simultaneously. This implementation would, of course, greatly increase the hardware requirements.

Figure 7:
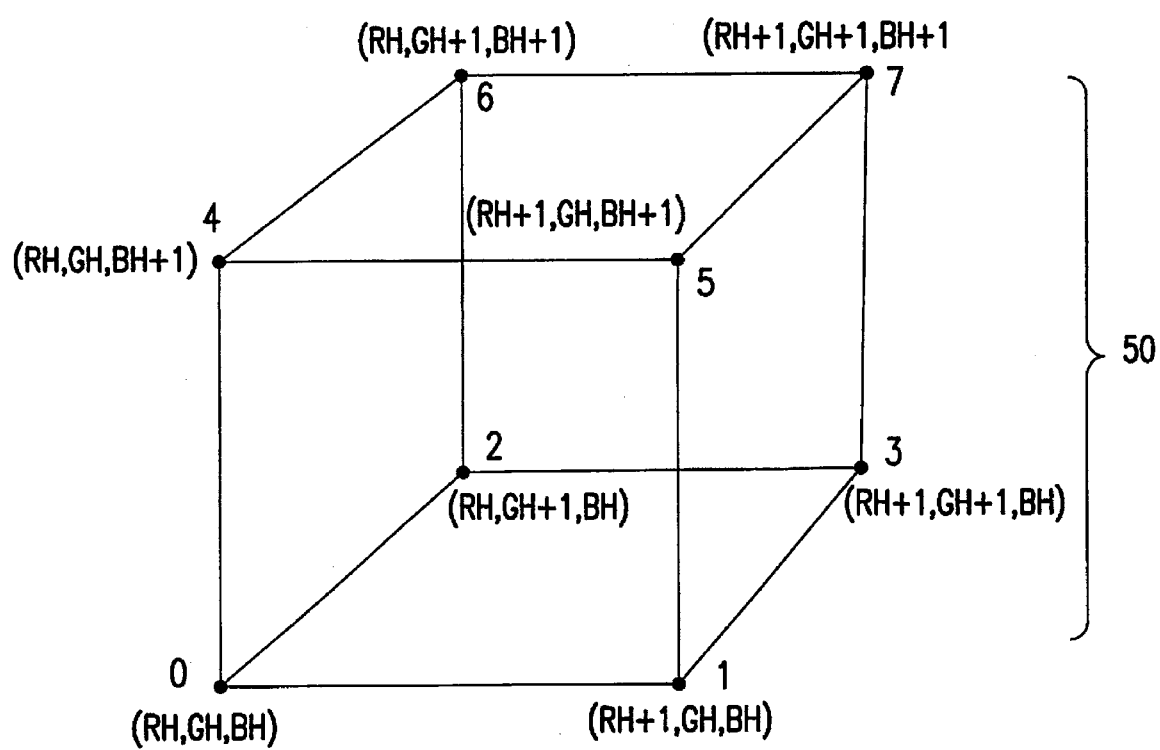
FIG. 7 is a drawing showing a cube in the cubic lattice with the relative addresses and the numbering of vertices shown.
Figure 8A:
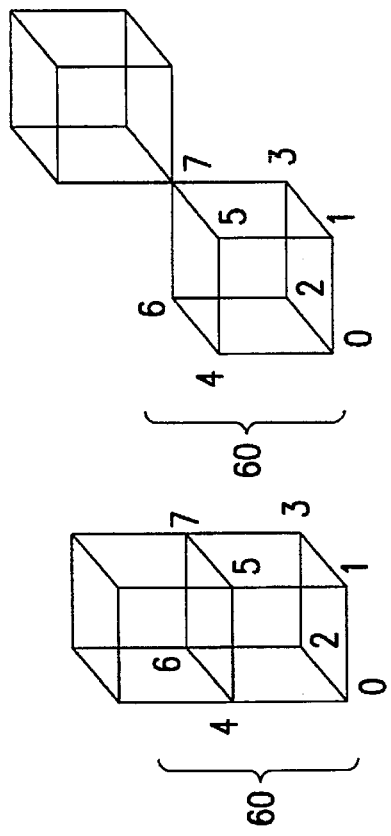
FIG. 8 is a drawing showing an exemplary cube of the cubic lattice and the additional cubes which result from using each of the eight vertices of the cube as an entry vertex into the cubic lattice.
Figure 8B:
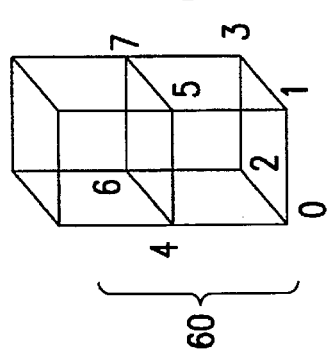
Figure 8C:
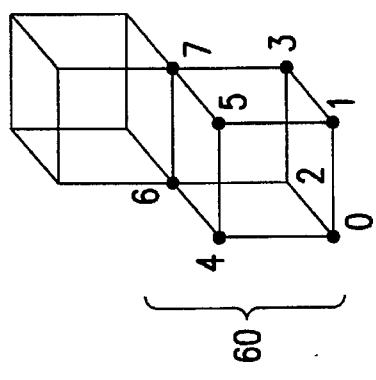
Figure 8D:
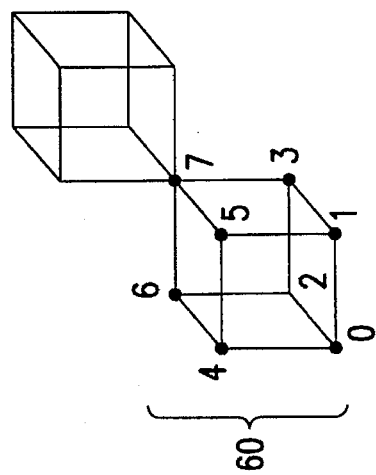
Figure 8E:
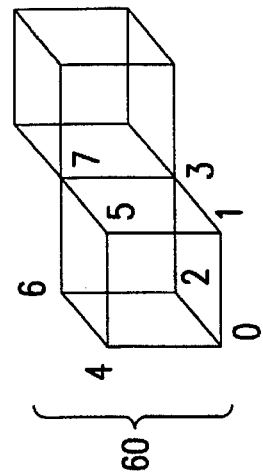
Figure 8F:
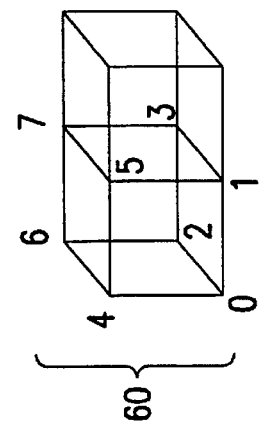
Figure 8G:
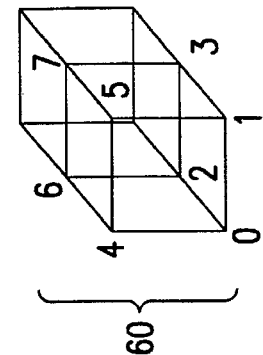

In FIG. 7 the cube 50 is shown with the relative addresses of the vertices and also a numbering of the vertices. Shown in FIG. 8 are the cubes formed when considering each of the remaining seven numbered vertices as the initial address for entry into the cubic lattice so that the selected vertex has the same orientation with respect to its seven associated vertices as the vertex numbered 0 of cube 60. For illustrative clarity, each of the seven cubes associated with cube 60 have been shown separately. The relative addresses of the eight vertices of a cube will be associated with the same vertex number within any cube in the cubic lattice. The cubic lattice includes a plurality of cubes having a numbering corresponding to cube 60 based upon the orientation of the cube in the cubic lattice. In the color space conversion apparatus shown in FIG. 6, each of the memory bank 42a–42h outputs is hardwired to interpolator inputs a0–a7, respectively. For correctly performing the interpolation, the values represented by the vertices 0–7 of any cube must be logically connected to the corresponding inputs a0–a7 of the interpolator depending upon the evenness or oddness characterization of the vertex used for entry into the cubic lattice. This is complicated by the storage of the eight values in the eight memory banks 42a–42h based upon the evenness or oddness of the address of the vertices in the cubic lattice.

Shown in FIG. 10 is a table having a listing of the interpolator inputs (a0–a7) of FIG. 3 to which the memory outputs of memory bank 42 should be directed. The table of FIG. 10 was generated by selecting a cube in the cubic lattice with the vertex numbered 0 having the address (RH, GH, BH) assigned to it. Then, for the case of each of the eight vertices of the selected cube {listed by their addresses relative to (RH, GH, BH)} successively becoming the initial address for entry into the cubic lattice to perform a color space conversion, listing the interpolator inputs to which the memory outputs should be logically connected for the eight vertices forming the cube. For any selected relative address becoming the initial address for entry into the cubic lattice, the interpolator inputs to which the eight memory bank 42a–42h outputs (as designated by the headings for each column) should be logically connected are listed in the row associated with the relative address. For example, if the vertex having the relative address (RH, GH, BH) is categorized as (E,E,E), then, for the cube formed using the vertex having the relative address (RH, GH, BH+1) as the entry vertex into the cubic lattice, the logical connection between the memories and the interpolator inputs is as follows:

| (E,E,E) | (O,E,E) | (E,O,E) | (O,O,E) | (E,E,O) | (O,E,O) | (E,O,O) | (O,O,O) |
|---------|---------|---------|---------|---------|---------|---------|---------|
| a4      | a5      | a6      | a7      | a0      | a1      | a2      | a3      |

As can be seen from the table of FIG. 10, for every one of the eight memory banks 42a–42h there is the requirement that its respective output value will be logically connected to each of the interpolator inputs depending upon the address of the vertex used as the entry into the cubic lattice.

The prior art methods of performing this logical connection employed a multiplexer to route the outputs of the eight memory banks 42a–42h to the correct interpolator input. To solve this problem it was recognized that by using a two's complement of combinations of RL, GL, and BL input to the interpolator of FIG. 3, the interpolation process using the outputs of memory bank 42a–42h could be performed correctly even though the connection of the outputs of memory 42 to the inputs a0–a7 of hardware interpolator 43 was fixed. Using the two's complement of combinations of RL, GL, and BL allows the routing of the outputs of the memory bank 42a–42h to be accomplished mathematically. As shown in FIG. 6, the outputs of the eight memory banks 42a–42h are connected, respectively, to the inputs a0–a7 of interpolator 43. With this connection, for the case in which the vertex labeled 0 is catagorize with respect to evenness and oddness as (E,E,E), the result of the interpolation will be correct using RL, GL, and BL without the two's complement operation applied.

Figure 9:
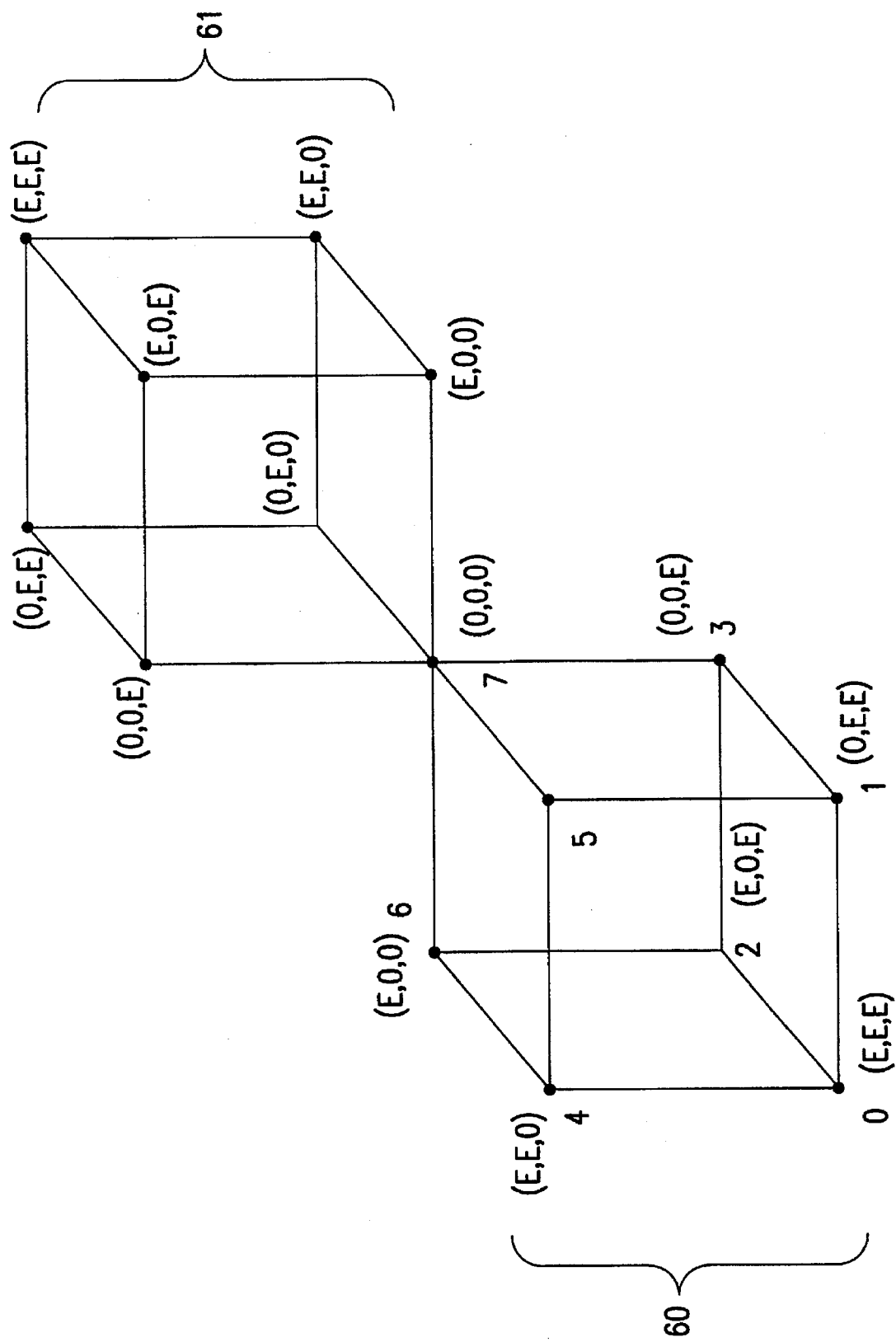
FIG. 9 is a drawing showing a pair of exemplary cubes in the cubic lattice and their corresponding evenness and oddness categorization.

Referring to FIG. 9, consider the case in which a color space conversion is performed using the address corresponding to vertex number 7 of cube 60 in FIG. 8 as the entry address into the cubic lattice. In FIG. 9, for both cube 60 and the cube 61 formed using the vertex numbered 7, each of the vertices are labeled with respect to the evenness or oddness of the components of the address of the vertex. As can be seen in the table of FIG. 10, for the case in which the vertex 7 is catagorize as (O,O,O), the outputs of the eight memory banks 42a–42h must correspond logically to the inputs a7–a0, respectively, of the hardware interpolator 43 for the correct result to be obtained in the interpolation process. If for each occurrence of RL, GL, and BL in the interpolation process of FIG. 3 the two's complement of these values is substituted, the final result obtained will be correct. For the interpolation process shown in FIG. 3, the two's complement of RL, GL, and BL would be respectively, 16-RL, 16-GL, and 16-BL. Consider, for example, the block of the interpolation process of FIG. 3 including:

$$[\{(a1-a0) \times RL'\} \div 16] + a0. \qquad \text{equation 2}$$

If "16-RL" is substituted for "RL'", the resulting expression is:

$$[\{(a0-a1) \times RL\} \div 16] + a1. \qquad \text{equation 3}$$

The effect has been to switch the position of the a0 and a1 values in the corresponding computational block. Performing a two's complement substitution for each of RL', GL', and BL' in FIG. 3 and completing the algebraic manipulation yields an interpolation expression in which, relative to the original expression, a0–a7 have been replaced with a7–a0 respectively. Thus, by using a two's complement the placement of the outputs of the eight memory banks 42a–42h in the interpolation expression is performed correctly.

For cases in which the addresses corresponding to the remaining six vertices of the cube 60 in FIG. 8 are used as entry addresses into the cubic lattice, selectively performing a two's complement operation on combinations of RL, GL, and BL yields the correct interpolation expression in a manner similar to that previously described. It will be recognized that the necessity of performing a two's complement operation on one or more of RL, GL, and BL to yield the correct interpolation expression depends upon the evenness or oddness categorization of the address corresponding to the vertex used as the entry address into the cubic lattice when performing a color space conversion. In table 3 below, the necessity of performing a two's complement on RL, GL, and BL depending on the evenness and oddness categorization of RH, GH, and BH is indicated:

TABLE 3

| CUBIC LATTICE ENTRY ADDRESS | PERFORM TWO'S COMPLEMENT? | | |
|---|---|---|---|
| CATEGORIZATION | RL | GL | BL |
| (E,E,E) | NO  | NO  | NO  |
| (E,E,O) | NO  | NO  | YES |
| (O,E,O) | YES | NO  | YES |
| (O,E,E) | YES | NO  | NO  |
| (O,O,E) | YES | YES | NO  |
| (E,O,E) | NO  | YES | NO  |
| (E,O,O) | NO  | YES | YES |
| (O,O,O) | YES | YES | YES |

The selective two's complementer 45 includes the capability to selectively perform the two's complement function on one or more of RL, GL, and BL in response to the evenness or oddness categorization of, respectively, RH, GH, and BH as indicated in Table 3.

Figure 11:
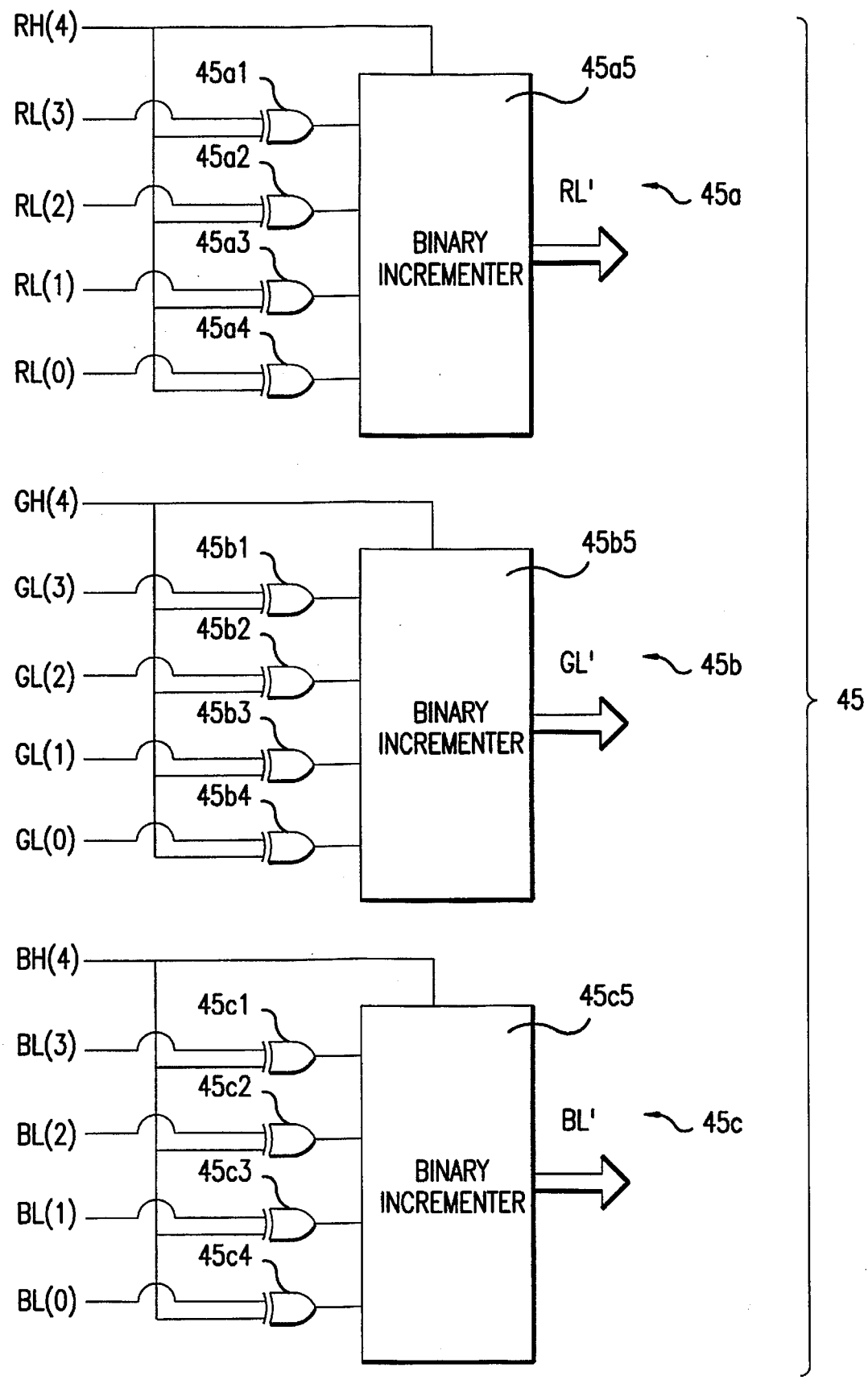
FIG. 11 is a block diagram of a selective two's complementer used for routing the outputs of the eight memory banks to the correct interpolator calculation block based upon the evenness or oddness of the vertex of the cube used as the entry vertex into the cubic lattice.

Shown in FIG. 11 is the preferred embodiment of the selective two's complementer 45 of FIG. 6. The least significant bit {RH(4), GH(4), and BH(4)} of each of the higher order groups of bits is used to control the selective performance of the two's complement operation on, respectively, RL, GL, and BL. When one or more of the bits RH(4), GH(4), and BH(4) have a value of 1, the corresponding RH, GH, and BH will be odd and thus require that a two's complement be performed on the respective RL, GL, and BL. The selective two's complementer 45 includes three separate two's complementers 45a–45c, one for each of RL, GL, and BL. Each of the three two's complementers 45a–45c includes a set of exclusive OR gates 45a1–45c4 and a binary incremented 45a5–45c5. The input to each of the sets of exclusive OR gates 45a1–45c4 consists of the four bits from each of RL, GL, and BL and the least significant bits RH(4), GH(4), and BH(4), respectively. Each of the binary incrementers 45a5–45c5 adds the value of the associated RH(4), GH(4), and BH(4) bit to the outputs of the exclusive OR gates 45a1–45c4. The output of each of the binary incrementers 45a5–45c5 includes five bits. The two's complement is performed by selectively inverting the RL, GL, or BL (depending upon whether the corresponding RH(4), GH(4), or BH(4) bits are odd) using the exclusive OR gates 45a1–45a3, 45b1–45b3, and 45c1–45c3 and adding, respectively, RH(4), GH(4), and BH(4) to the result using the binary incrementers 45a5–45c5. The techniques used to design selective two's complementer 45 are well know to one skilled in the art of digital design.

The preferred embodiment of the color space conversion apparatus 40 is implemented in an ASIC for maximizing the speed of the color space conversion. However, as one skilled in the art will recognize, the functions performed by the ASIC implementation of the color space conversion apparatus may be accomplished using a microprocessor. For example, the functions accomplished using the dedicated hardware of the selective two's complementer 45 may be accomplished through the operation of a microprocessor. Additionally, the functions performed by the hardware interpolator 44 and address generator 43 may also be accomplished using a microprocessor. In using a microprocessor a tradeoff would be made between the simplicity of the hardware design of the color space converter and the conversion speed.

Figure 12:
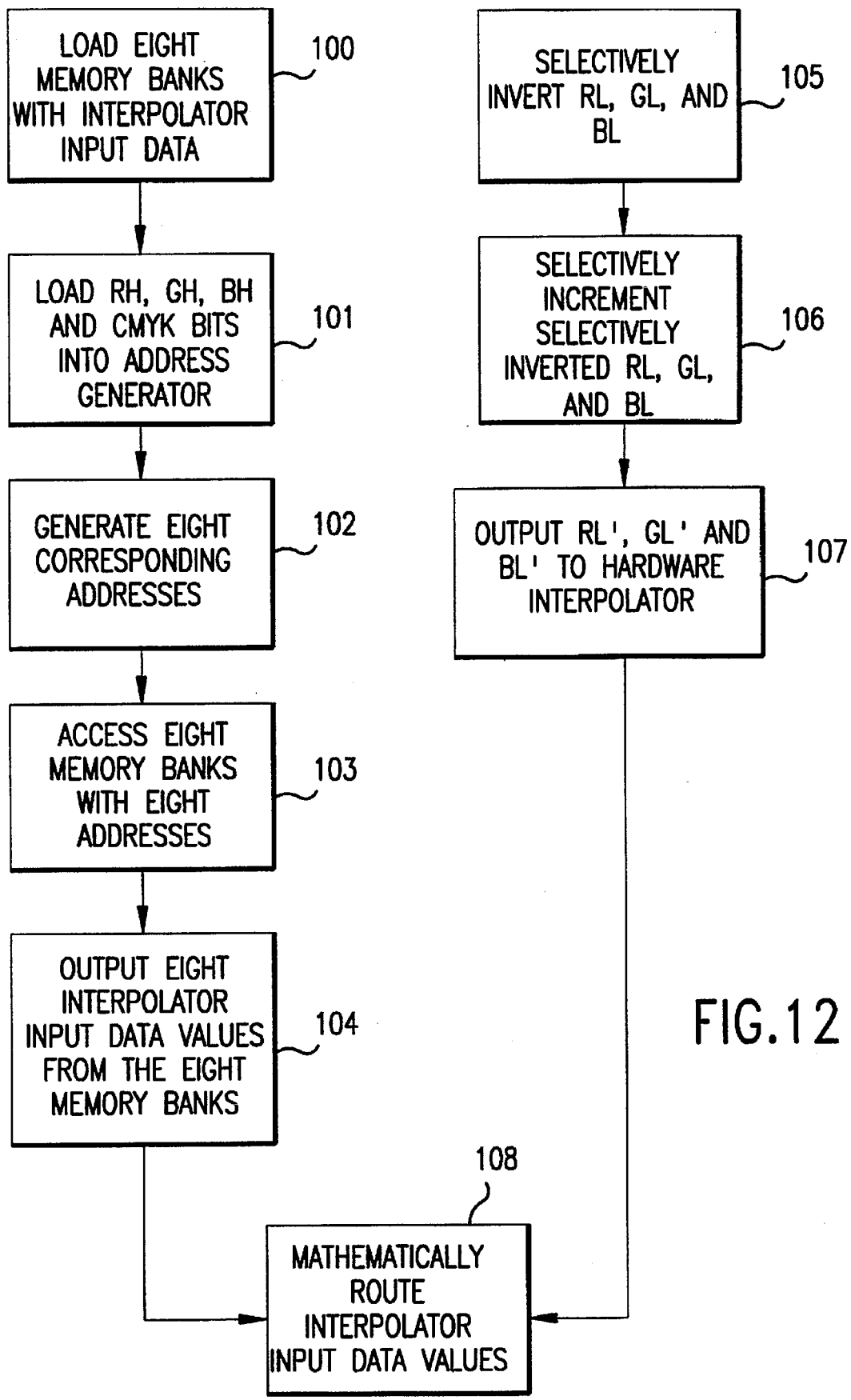
FIG. 12 is a flow diagram describing a method for using the disclosed embodiment of the apparatus for routing interpolator input data.

Shown in FIG. 12 is a flow diagram of a method for routing interpolator input data using the color space conversion apparatus 40 of FIG. 6. Prior to the routing of the interpolator input data, the eight memory banks 42a–42h must be loaded 100 with interpolator input data values corresponding to the vertices of the cubic lattice of each of the dimension of the output color space to which the conversion is directed. This memory initialization step is performed prior to the start of the color space conversion and is not repeated as successive RGB input data values undergo color space conversion. Next, the address generator 43 loads 101 the higher order bits RH, GH, BH and the CMYK bits for selecting the dimension in the output color space to which the conversion is directed. Then, the address generator 43 generates 102 the eight addresses corresponding to the vertices of the cube defined by the loaded higher order and CMYK bits. Next, the eight addresses are used for accessing 103 the eight memory banks 42a–42h. Then, each of the eight memory banks 42a–42h outputs 104 a data value for each of the eight inputs of the interpolator a0–a7, respectively.

Operating contemporaneously with the generation of the interpolator input data in the previously listed steps, the apparatus for routing interpolator input data 45 selectively inverts 105 each of RL, GL, and BL based upon the state of RH(4), GH(4), and BH(4), respectively. Next, the selectively inverted RL, GL, and BL are selectively incremented 106 based upon the respective states of RH(4), GH(4), and BH(4). Then, the resulting RL', GL', and BL' are output 107 to hardware interpolator 44. Finally, the interpolator input data values are mathematically routed 108 by hardware interpolator using RL', GL', and BL'.

The preferred embodiment of the color space conversion apparatus 40 of FIG. 6, will be implemented entirely on a single application specific integrated circuit (ASIC). In the patent application filed by Jones, U.S.P.T.O. Ser. No. 08/375, 096, a hardware multiplexor is used to control the routing of the interpolator input data to the correct interpolator input. Implementation of the apparatus for routing interpolator input data disclosed in this application in the color space conversion ASIC results in a reduction of the number of gates relative to that required for the implementation disclosed in the Jones application. Additionally, because in the disclosed color space converter the two's complement operation can be performed while the interpolation input data values are accessed from memory, the color space conversion can be performed more quickly. In the Jones application, an additional delay occurs as the multiplexing of the accessed memory values is performed. Furthermore, the Jones application does not disclose the use of an expanded look-up table to handle color space conversions of input data values on the outer bounds of the input color space.

In U.S. Pat. No. 4,275,413, issued to Sakamoto et. al., a method and apparatus of color space interpolating using tetrahedra is disclosed. A scanned image represented by three RGB values is logarithmically converted, digitized, and then separated into higher order and lower order bits for each of the RGB components. The three sets of higher order bits are used to access four points of a tetrahedron used for interpolation. In contrast, the disclosed embodiment of the color space conversion apparatus 40 forms addresses for eight memories which each contain one value corresponding to one of the eight vertices of a cubic volume in which the interpolation is performed. Sakamoto does not disclose the expanded look-up table, the address generator used to generate addresses to access the look-up table, or the use of the apparatus for data within the interpolator, as does the present application.

In U.S. Pat. No. 3,893,166, issued to Pugsley, a method of color space conversion between an RGB color space and a CMYK color space and a method of color space correction using cubic interpolation are disclosed. The disclosed methods employ a digital computer to generate the addresses to a memory which holds the values used for the interpolation. Dedicated hardware to perform the color space conversion is not disclosed.

In U.S. Pat. No. 4,477,833, issued to Clark et. al., an apparatus and method of color space conversion is disclosed which uses a set of four vectors generated based upon the lower order bits of the RGB color space input to address a memory containing a corresponding set of four vectors which include corrections for the input values. These correction vectors correct for changes induced in the RGB color space value which may result from scanning an image. The components of the correction vectors along with a set of difference values obtained from the original set of four vectors are used to interpolate to the output color space CMYK values. The present embodiment of the color space conversion apparatus utilizes a different method of selecting values used for the interpolation and it uses a different interpolation technique. Additionally, the Clark patent does not disclose the expanded look-up table, the address generator used to generate addresses to access the look-up table, or the use of the apparatus for routing interpolator input data to mathematically switch the interpolator input data within the interpolator.

Although several embodiments of the invention have been illustrated, and their forms described, it is readily apparent to those skilled in the art that various modifications may be made therein without departing from the spirit of the invention or from the scope of the appended claims.

What is claimed is:

1. An apparatus for routing interpolator input data used for a transformation of input data values each having n components to output data values each having i components, said n components represented by corresponding n sets of bits each partitioned to form n sets of higher order bits and n sets of lower order bits, said apparatus comprising:

a means for performing a selective two's complement arranged for receiving said n sets of lower order bits and a least significant bit from each of said n sets of higher order bits; and at least one means for interpolating arranged for receiving said interpolator input data, each of said means for interpolating coupled to said means for performing a selective two's complement.

2. The apparatus as recited in claim 1, wherein:

said means for performing a selective two's complement includes a selective two's complementer for selectively performing a two's complement operation on each of said n sets of lower order bits responsive to a predetermined state of corresponding said least significant bit to generate n sets of selectively two's complemented lower order bits, said selective two's complementer includes n outputs corresponding to said n sets of lower order bits.

3. The apparatus as recited in claim 2, wherein:

said means for interpolating includes a hardware interpolator.

4. The apparatus as recited in claim 3, wherein:

said hardware interpolator includes eight interpolator inputs for receiving said interpolator input data and n inputs for receiving said n outputs from said selective two's complementer.

5. The apparatus as recited in claim 4, wherein:

n equals 3, i equals 4, and each of said n sets of higher order and lower order bits includes 4 bits.

6. The apparatus as recited in claim 5, wherein:

said selective two's complementer includes three two's complementers, each of said two's complementers includes four exclusive OR gates and a binary incrementer, each of said exclusive OR gates includes a first input, a second input, and an output coupled to said binary incrementer, each of said first inputs coupled to one of said lower order bits, each of said least significant bits coupled to said second inputs of said exclusive OR gates having corresponding lower order bits coupled to said first input, and said least significant bits coupled to said binary incrementer.

7. The apparatus as recited in claim 6, wherein:

said hardware interpolator performs interpolation using parallel cascade processing.

8. A color space converter for converting color space input data from an input color space having n dimensions represented by n components to color space output data in an output color space having i dimensions represented by i components, said n components represented by n sets of bits each partitioned into a set of higher order bits and a set of lower order bits, m bits represent said n sets of higher order bits according to $m_1+m_2+ \ldots m_n=m$, said color space converter comprising:

a means for generating addresses arranged for receiving said m bits, said means for generating addresses for generating at least $\{[2^{m_1}+1] \times [2^{m_2}+1] \times \ldots \times [2^{m_n}+1]\}$ addresses;

a memory arranged to receive said addresses from said means for generating addresses, said memory including at least $\{[2^{m_1}+1] \times [2^{m_2}+1] \times \ldots \times [2^{m_n}+1]\}$ storage locations and a means for outputting interpolator input data stored in said storage locations;

at least one means for performing interpolation, each of said means for performing interpolation connected to said means for outputting interpolator input data; and a means for performing a selective two's complement connected to each of said means for performing interpolation, said means for performing a selective two's complement arranged for receiving said n sets of lower order bits and a least significant bit from each of said n sets of higher order bits, said means for performing a selective two's complement for selectively performing a two's complement of said n sets of lower order bits responsive to the state of corresponding said least significant bit and providing said selective two's complement of said n sets of lower order bits to each of said means for performing interpolation.

9. The color space converter as recited in claim 8, wherein:

said input color space includes a color space selected from the group consisting of a RGB, a Lab, a XYZ, a HSV, a Luv, a HLS, and a CMY color space, said output color space includes a color space selected from the group consisting of a RGB, a Lab, a XYZ, a HSV, a Luv, a HLS color space, and a CMYK color space.

10. The color space converter as recited in claim 9, wherein:

m equals 12.

11. The color space converter as recited in claim 10, wherein:

$m_1$, $m_2$, and $m_3$ each equal 4.

12. The color space converter as recited in claim 11, wherein:

said input color space includes a RGB color space and said output color space includes a CMYK color space;

said means for generating addresses generates at least $(\{[2^{m_1}+1] \times [2^{m_2}+1] \times [2^{m_3}+1]\} \times 4)$ of said addresses, said means for generating addresses includes a capability for receiving an additional 2 bits for successively selecting one component of said CMYK color space into which to convert said color space input data; and said memory includes at least $(\{[2^{m_1}+1] \times [2^{m_2}+1] \times [2^{m_3}+1]\} \times 4)$ of said storage locations divided among eight memory banks each having a memory address input, assignment of said storage locations to said eight memory banks occurs according to the evenness and oddness categorization of said interpolator input data stored in said storage locations, said means for outputting interpolator input data includes a memory data output for each of said memory banks.

13. The color space converter as recited in claim 12, wherein:

said means for generating addresses includes an address generator having eight address outputs each connected to one of said memory address inputs, said address generator generates eight of said addresses substantially simultaneously in response to receiving said m bits and said 2 bits;

said means for performing interpolation includes a hardware interpolator, said hardware interpolator includes eight interpolator inputs connected to each of said memory data outputs; and said means for performing a selective two's complement includes a selective two's complementer.

14. In an apparatus for routing interpolator input data used for a transformation of input data values having n components from a first space having a corresponding n dimensions to output data values having i components in a second space having a corresponding i dimensions, said n components represented by corresponding n sets of bits each partitioned to form n sets of higher order bits each having a least significant bit and n sets of lower order bits, said apparatus includes a means for performing a selective two's complement arranged for receiving said n sets of lower order bits and n said least significant bits and a means for interpolating coupled to said means for performing a selective two's complement, a method for routing said interpolator input data, comprising the steps of:

loading said n sets of lower bits and n said least significant bits into said means for performing a selective two's complement;

selectively performing a two's complement operation upon said n sets of lower order bits responsive to the states of n said least significant bits to generate n two's complementer output values;

loading said interpolator input data into said means for interpolating;

loading n said two's complementer output data values into said means for interpolating; and interpolating using said interpolator input data and said n output values.

15. The method as recited in claim 14, wherein:

said step of loading said interpolator input data and said step of loading n said two's complementer output data values occurs substantially simultaneously.

16. The method as recited in claim 15, wherein:

said first space includes an input color space and said second space includes an output color space; and said input color space includes 3 dimensions and said output color space includes 4 dimensions.

17. The method as recited in claim 16, wherein:

said means for performing a selective two's complement includes a selective two's complementer and said means for interpolating includes a hardware interpolator.

18. The method as recited in claim 17, wherein:

said input color space includes a RGB color space and said output color space includes a CMYK color space.

* * * * *